(12) United States Patent
Leininger et al.

(10) Patent No.: US 10,940,578 B2
(45) Date of Patent: Mar. 9, 2021

(54) INDUCTION-POWERED DEVICE HAVING A LOAD NESTED WITHIN A CORE OF A MULTI-PART BOBBIN, AND POWER TOOL ATTACHMENT AND POWER TOOL COMPRISING SAME

(71) Applicants: Jon J. Leininger, Wilson, NY (US); Richard A. Hornung, Hamilton Township (CA)

(72) Inventors: Jon J. Leininger, Wilson, NY (US); Richard A. Hornung, Hamilton Township (CA)

(73) Assignee: 1543803 ONTARIO LTD., Whitby (CA)

( * ) Notice: Subject to any disclaimer, the term of this patent is extended or adjusted under 35 U.S.C. 154(b) by 338 days.

(21) Appl. No.: 15/718,730

(22) Filed: Sep. 28, 2017

(65) Prior Publication Data

US 2018/0085901 A1 Mar. 29, 2018

Related U.S. Application Data

(60) Provisional application No. 62/400,726, filed on Sep. 28, 2016.

(51) Int. Cl.
| | | |
|---|---|---|
| *B25B 23/18* | (2006.01) | |
| *B25F 5/02* | (2006.01) | |
| *H02K 7/14* | (2006.01) | |
| *H02K 1/27* | (2006.01) | |
| *B25H 1/00* | (2006.01) | |
| *H02K 3/32* | (2006.01) | |

(52) U.S. Cl.
CPC ............... *B25B 23/18* (2013.01); *B25F 5/021* (2013.01); *B25F 5/024* (2013.01); *H02K 1/2713* (2013.01); *H02K 7/145* (2013.01); *B25H 1/0092* (2013.01); *H02K 3/32* (2013.01); *H02K 3/325* (2013.01); *H02K 2203/12* (2013.01)

(58) Field of Classification Search
CPC .......... B25B 23/18; B25F 5/021; B25F 5/024; B25H 1/0092; F21V 19/002; H02K 1/2713; H02K 7/145; H02K 3/32; H02K 3/325
See application file for complete search history.

(56) References Cited

U.S. PATENT DOCUMENTS

| | | | | |
|---|---|---|---|---|
| 4,321,572 A | * | 3/1982 | Studer | H01F 38/18 336/120 |
| 4,692,754 A | * | 9/1987 | Edejer | A47L 9/04 15/319 |
| 5,015,944 A | * | 5/1991 | Bubash | G01R 15/183 324/127 |

(Continued)

OTHER PUBLICATIONS

International Searching Authority, International Search Report, dated Dec. 20, 2017, pp. 1 to 3, Canada.

(Continued)

*Primary Examiner* — Shawki S Ismail
*Assistant Examiner* — Demetries A Gibson

(57) ABSTRACT

An induction-powered device for use in an alternating magnetic field comprises: a magnetically permeable core; an electrically conductive coil surrounding the core; and an electrical load electrically connected to the coil. The coil is configured to generate a voltage when exposed to the alternating magnetic field, to power the electrical load.

13 Claims, 15 Drawing Sheets

(56) References Cited

U.S. PATENT DOCUMENTS

| | | | | |
|---|---|---|---|---|
| 5,287,087 | A | * | 2/1994 | Jencks .................. H01F 7/1607 |
| | | | | 324/127 |
| 5,495,977 | A | * | 3/1996 | Hildebrandt ......... B23K 20/129 |
| | | | | 228/112.1 |
| 5,525,842 | A | | 6/1996 | Leininger |
| 5,565,833 | A | * | 10/1996 | Leet .......................... H01F 5/02 |
| | | | | 335/250 |
| 5,764,152 | A | * | 6/1998 | Kozleski ................. F16K 31/06 |
| | | | | 239/585.1 |
| 5,801,454 | A | | 9/1998 | Leininger |
| 6,713,905 | B2 | | 3/2004 | Hirschburger et al. |
| 7,568,288 | B2 | | 8/2009 | Baker |
| 7,728,464 | B2 | | 6/2010 | Leininger |
| 8,519,558 | B2 | | 8/2013 | Leininger |
| 2005/0258694 | A1 | | 11/2005 | Leininger |
| 2009/0075519 | A1 | * | 3/2009 | Daily ................... H01R 33/225 |
| | | | | 439/620.02 |
| 2009/0080201 | A1 | * | 3/2009 | Wu ......................... F21V 15/01 |
| | | | | 362/362 |
| 2011/0063820 | A1 | * | 3/2011 | Wang ..................... B25B 23/18 |
| | | | | 362/120 |
| 2013/0021783 | A1 | * | 1/2013 | Vanko ..................... B25F 5/021 |
| | | | | 362/119 |
| 2013/0313836 | A1 | | 11/2013 | Leininger |
| 2014/0378760 | A1 | * | 12/2014 | Ito .......................... A61B 5/065 |
| | | | | 600/103 |

OTHER PUBLICATIONS

International Searching Authority, Written Opinion of the International Searching Authority, dated Dec. 20, 2017, pp. 1 to 5, Canada.
International Search Report and Written Opinion of counterpart PCT/CA2017/051148.

* cited by examiner

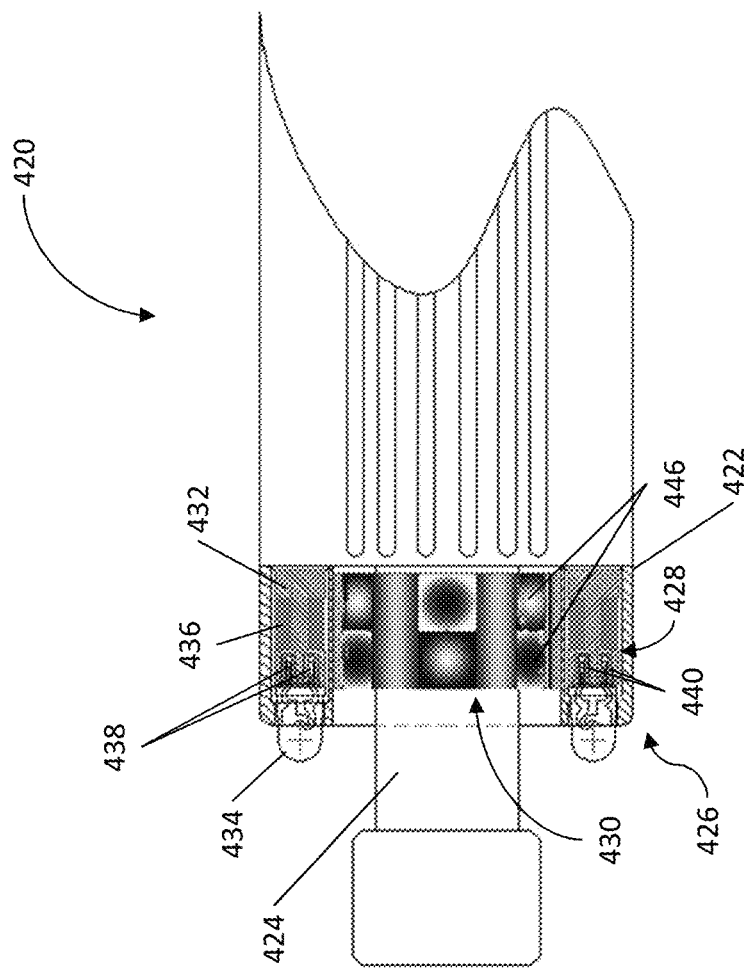
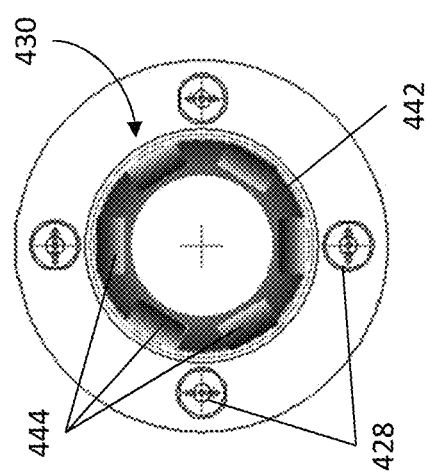
FIG. 13
FIG. 12

INDUCTION-POWERED DEVICE HAVING A LOAD NESTED WITHIN A CORE OF A MULTI-PART BOBBIN, AND POWER TOOL ATTACHMENT AND POWER TOOL COMPRISING SAME

CROSS-REFERENCE TO RELATED APPLICATION

This application claims the benefit of U.S. Provisional Application No. 62/400,726 to Leininger et al. filed on Sep. 28, 2016, the entire content of which is incorporated herein by reference.

FIELD

The following relates generally to induction-powered devices and more particularly to an induction-powered device for use in an alternating magnetic field, such as a magneto-luminescent device (MLD) for use with a multi-pole magnetic rotor, as well as to a power tool and a power tool attachment comprising the same.

BACKGROUND

Illumination devices for tools are known. These devices can help to enhance vision and safety when a technician or other operator is performing a task, particularly in low or reduced light environments.

Power tools are regularly used to assist with tasks and come in a variety of configurations including high-rpm rotary tools, such as multi-purpose rotary tools, grinders, die grinders, drills and the like. In some instances, illumination devices for these power tools rely on a magnetic rotor and a stator to generate power for a light source. Such illumination devices are known as magneto-luminescent devices (MLDs) and examples include U.S. Pat. No. 5,525,842 issued on Jun. 11, 1996, U.S. Pat. No. 5,801,454 issued on Sep. 1, 1998, and U.S. Reissued Pat. No. 36,917 reissued on Oct. 17, 2000, all of which were issued or reissued to Jon J. Leininger and are incorporated herein by reference, in their entirety. These references disclose an improved air tool, which includes an integrated air motor and electrical generator. The stator is positioned on a side of the rotor body opposite the working end of the tool to reduce vibrations transmitted to the stator. The stator is also positioned between the compressed air inlet and the rotor body such that compressed air flows across the stator to prevent overheating of the stator. The air tool includes an indicating circuit connected to the battery charging circuit for indicating a battery charge condition, a battery discharge condition and a low lubrication condition of the air vanes. A light ring assembly is attached to the working end of the tool housing to provide light at the working end of the tool. Materials chosen for the magnets and the poles of the stator increase the power capability of the electrical generator. An illuminating apparatus for a conventional air tool with a light ring and integral generator is also disclosed.

Another example of a known MLD is disclosed in U.S. Pat. No. 6,713,905 issued on Mar. 30, 2004, to Hirschburger et al. This reference discloses a rotary power tool having a light source that includes a housing, an electric motor provided in the housing and an elongated spindle engaged with and adapted to be rotatably driven by the motor. A rotatable holding assembly is attached to an end of the spindle and extends from a front end of the housing for holding a tool accessory. At least one magnet is adapted to be rotated by the spindle, for producing a magnetic field, and a generally tubular sleeve is attached to the front end of the housing. At least one light emitting diode projects from a front end of the sleeve, generally between the inner and the outer surfaces of the sleeve. An inductive coil is also embedded at least partially in the sleeve generally between the inner and the outer surfaces, proximate the magnet for generating an electric current from the magnetic field. Electrical conductors are also embedded and routed through the sleeve for supplying the electric current from the inductive coil to the light emitting diode.

Improvements are generally desired. Accordingly, it is an object at least to provide a novel induction-powered device, and a power tool attachment and power tool comprising the same.

SUMMARY

According to an aspect, there is provided a magneto-luminescent device (MLD) for use with a multi-pole magnetic rotor, the MLD comprising: a bobbin having a core; a light source nested within the core; and a coil surrounding the core, the coil being electrically connected to the light source.

In some embodiments, the induction-powered device may include a selection of the following features. The light source may comprise a light emitting diode. The bobbin may be split and may comprise at least two constituent parts that connect to define a pair of opposing flanges and the core of the bobbin therebetween. The constituent parts, when separate, may permit the coil to be positioned around at least a portion of the core and, when connected, may retain the coil around the core. The at least two constituent parts, when separate, may disconnect at least a portion of the opposing flanges from at least a portion of the core and, when connected, may position the coil between the pair of opposing flanges to retain the coil around the core. The at least two constituent parts may comprise: a female bobbin having a first flange of the pair of opposing flanges and a female core; and a male bobbin having a second flange of the pair of opposing flanges and a male core portion for mating with the female core, the male core portion and the female core portion defining the core of the split bobbin when mated. The light source may be retained within the core of the bobbin when the male core portion and the female core portion are mated. One of the pair of opposing flanges may be adjacent the light source and may have an inwardly sloped, conical outer face. The MLD may further comprise a circuit board for electrically connecting the coil to the light source. The circuit board may be located adjacent one of the pair of opposing flanges at a back end of the bobbin. The core may be made of annealed solenoid grade stainless steel. The coil may be configured to generate a voltage of 2.5 to 5 volts when exposed to an alternating magnetic field having an intensity of 500 to 1500 AC gauss. The coil may comprise from 250 to 500 turns and may be made of magnet wire having a diameter of approximately 0.004 to 0.007 inches. The light source may be configured to emit from 16 to 26 lumens of light when the voltage is applied across the light source.

According to another aspect, there is provided a power tool attachment for use with a power tool having a rotatable member, the power tool attachment comprising: a sleeve for securing to a working end of the power tool; at least one magneto-luminescent device, as defined above, secured to the sleeve; and a multi-pole magnetic rotor for securing to the rotatable member, wherein the sleeve comprises a through-hole for receiving the rotatable member and the magnetic rotor.

In some embodiments, the power tool attachment may include a selection of the following features. The magnetic rotor may comprise a plurality of magnetic rings. The plurality of magnetic rings may be rotationally offset about the rotational axis of the magnetic rotor such that opposite poles of the magnetic rings are aligned in the direction of the rotational axis. One of the plurality of magnetic rings may be aligned in a plane defined by one end of the coils of the at least one MLD and another of the plurality of magnetic rings may be aligned in a second plane defined by an opposite end of the coils. The at least one MLD may comprise a plurality of MLDs and the MLDs may concentrically surround the magnetic rotor. The at least one MLD may be secured to the sleeve by being embedded within the sleeve.

According to yet another aspect, there is provided a power tool comprising: a body; a rotatable member extending from the body; at least one magneto-luminescent device, as defined above, secured to the body; and a multi-pole magnetic rotor secured to the rotatable member.

In some embodiments, the power tool may include a selection of the following features. The magnetic rotor, the light sources of the at least one MLD and the coils of the at least one MLD may be aligned in a common plane that is perpendicular to a rotational axis of the magnetic rotor. The magnetic rotor may comprise a plurality of magnetic rings. The plurality of magnetic rings may be rotationally offset about the rotational axis of the magnetic rotor such that opposite poles of the magnetic rings are aligned in the direction of the rotational axis. One of the plurality of magnetic rings may be aligned in a plane defined by one end of the coils of the at least one MLD and another of the plurality of magnetic rings may be aligned in a second plane defined by an opposite end of the coils. The at least one MLD may comprise a plurality of MLDs and the MLDs may concentrically surround the magnetic rotor. The at least one MLD may be secured to the body by being embedded within a working end of the body.

According to yet another aspect, there is provided a magneto-luminescent device (MLD) comprising: a circuit board having a front side and a back side; at least one light source having a body and a pair of leads, the at least one light source being secured to the circuit board such that the body is adjacent the front side of the circuit board and at least portions of the leads extend from the back side; an elongate core secured to at least two of the portions of the leads extending from the back side; a plurality of insulators surrounding the portions of the leads secured to the core, the plurality of insulators being located between the leads and the core; and a coil surrounding the core and electrically connected to the at least one light source via the circuit board.

In some embodiments, the MLD may include a selection of the following features. The portions of the leads secured to the core may be secured to opposing end portions of the core. The circuit board may be generally annular and the core may extend a quarter-turn around a central axis of the MLD.

According to yet another aspect, there is provided a power tool attachment for use with a power tool having a rotatable member, the power tool attachment comprising: a sleeve for securing to a working end of the power tool; at least one magneto-luminescent device, as defined above, secured to the sleeve; and a multi-pole magnetic rotor for securing to the rotatable member, wherein the sleeve comprises a through-hole for receiving the rotatable member and the magnetic rotor.

In some embodiments, the power tool attachment may include the following feature. The magnetic rotor may comprise a four-pole magnetic ring and the core of the MLD may extend a quarter-turn around a central axis of the magnetic rotor.

According to yet another aspect, there is provided a power tool comprising: a body; a rotatable member extending from the body; at least one magneto-luminescent device, as defined above, secured to the sleeve; and a multi-pole magnetic rotor secured to the rotatable member.

In some embodiments, the magnetic rotor may comprise a four-pole magnetic ring and the core of the MLD may extend a quarter-turn around a central axis of the magnetic rotor.

According to yet another aspect, there is provided an induction-powered device for use in an alternating magnetic field, the induction-powered device comprising: a magnetically permeable core; an electrically conductive coil surrounding the core; and an electrical load electrically connected to the coil, wherein the coil is configured to generate a voltage when exposed to the alternating magnetic field, to power the electrical load.

In some embodiments, the induction-powered device may include a selection of the following features. The load may comprise at light source having at least one light emitting diode (LED). The light source may be configured to emit from 16 to 26 lumens of light. The load may comprise a DC integrated circuit chip with a full wave bridge AC to DC rectifier. The induction-powered device may further comprise a bobbin. The bobbin may comprise at least two constituent parts that connect to define a pair of opposing flanges and the core therebetween. The constituent parts, when separate, may permit the coil to be positioned around at least a portion of the core and, when connected, may retain the coil around the core. The at least two constituent parts, when separate, may disconnect at least a portion of the opposing flanges from the core to permit the coil to be positioned around the portion of the core and, when connected, may position the coil between the pair of opposing flanges to retain the coil around the core. The at least two constituent parts of the bobbin may comprise: a female bobbin having a first flange of the pair of opposing flanges and a female core; and a male bobbin having a second flange of the pair of opposing flange and a male core portion for mating with the female core, the male core portion and the female core portion defining the core of the bobbin when mated. The electrical load may be nested within the core of the bobbin and may abut the male core portion and the female core portion to retain the electrical load within the core of the bobbin. The at least two constituent parts of the bobbin may comprise: a female end cap having a first flange of the pair of opposing flanges and a void; and a male bobbin having a second flange of the pair of opposing flanges, an elongate core portion and an end portion opposite the second flange for mating with the void of the female end cap, the male bobbin and the female end cap may define the bobbin when mated. The induction-powered device may further comprise a circuit board electrically connecting the coil to the electrical load and the circuit board may be located adjacent a side of the bobbin. The electrical load may be configured to emit light from a longitudinal side of the induction-powered device. The electrical load may include a pair of insulated leads and the induction-powered device may further comprise: a circuit board having a front side and a back side, the electrical load being secured to the front side of the circuit board with at least a portion of the leads extending to and from the back side, the core may be secured adjacent the back side of the circuit board by the portion of the leads. The induction-powered device may further comprise at least one additional electrical load with a pair of insulated leads and the core may extend between leads of the electrical load and the leads of the additional electrical load. The circuit board may be annular and the core may extend a quarter-turn around a central axis of the circuit board. The core may be made of a high magnetic permeability material. The coil may comprise from 250 to 500 turns and may be made of conductive wire having a diameter in the range of approximately 0.004 to 0.007 inches, and more particularly from 350 to 500 turns of conductive wire having a diameter in the range of approximately 0.004 to 0.005 inches. The coil may be configured to generate a voltage of 24 volts or less, and more particularly from 1 to 10 volts, and even more particularly from 2.5 to 5 volts when exposed to the alternating magnetic field. The coil may be configured to generate a voltage from 2.5 to 5 volts when exposed to the alternating magnetic field having an intensity of 500 to 1500 AC gauss.

According to yet another aspect, there is provided a power tool attachment comprising: at least one induction-powered device as defined above; and a sleeve configured to secure the at least one induction-powered device to a power tool.

In some embodiments, the power tool attachment may be for use with a power tool and the power tool attachment may further comprise a multi-pole magnetic rotor for attaching to a rotating member of the power tool, to generate an alternating magnetic field to power the induction-powered device.

According to yet another aspect, there is provided a power tool comprising: at least one induction-powered device as defined above; a motor; and a multi-pole magnetic rotor for generating an alternating magnetic field to power the induction-powered device, the magnetic rotor being coupled to the motor.

Other aspects and advantages will become apparent from the embodiments described and claimed herein, with reference being made to the accompanying drawings, which form a part hereof.

BRIEF DESCRIPTION OF THE DRAWINGS

Embodiments will now be described more fully with reference to the accompanying drawings, in which:

FIG. 12 is a front view of a power tool incorporating a plurality of MLDs and a six-bar magnetic rotor, a spindle of the power tool has been omitting to avoid obscuring the rotor;

FIG. 13 is a partial sectional view taken along a longitudinal axis of the power tool of FIG. 12;

DETAILED DESCRIPTION OF EMBODIMENTS

Figure 1:
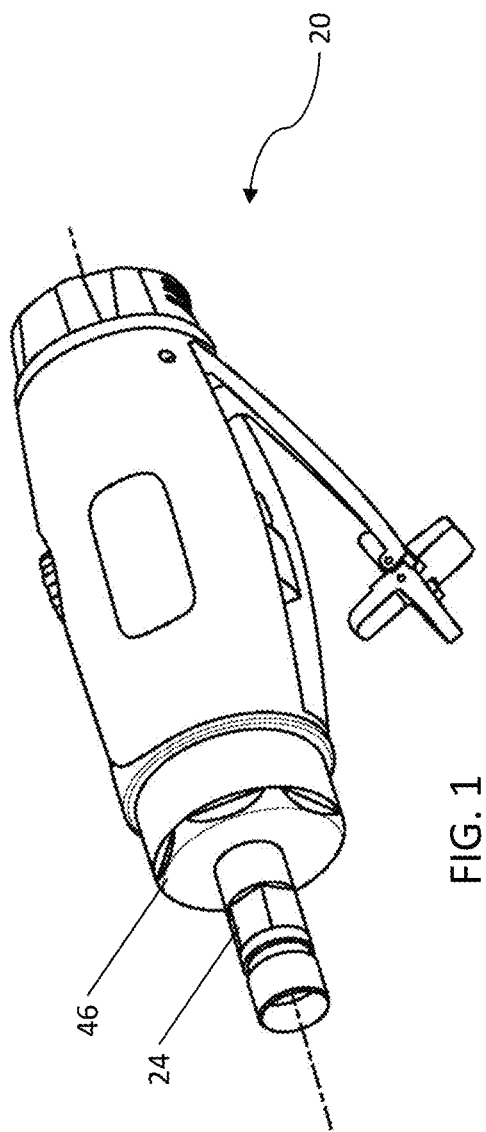
FIG. 1 is an axonometric view of a power tool.
Figure 2:
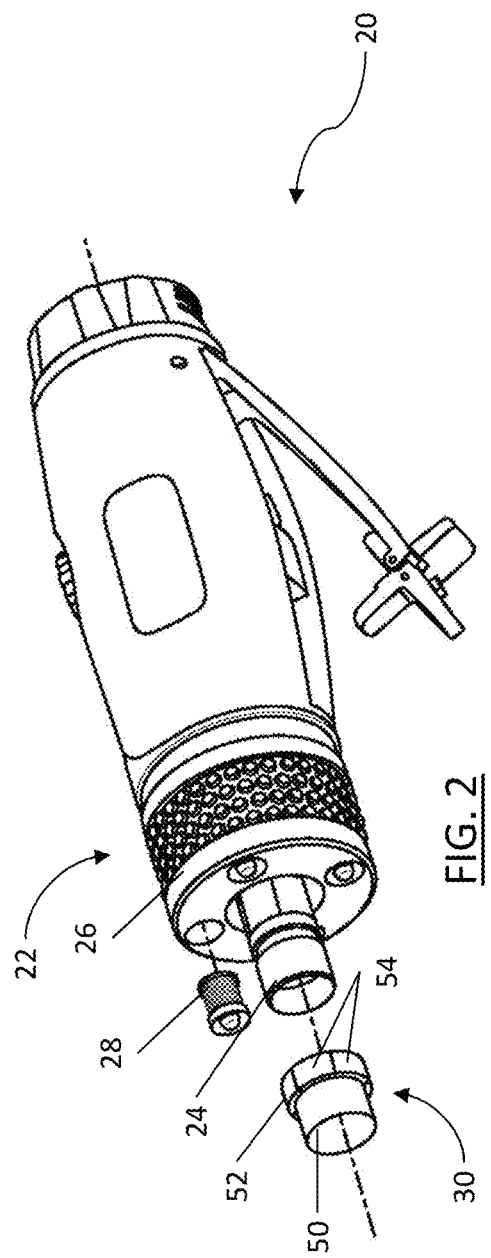
FIG. 2 is an axonometric view of the power tool of FIG. 1 with a power tool attachment secured thereon, a magnetic rotor of the power tool attachment and an MLD of the power tool attachment are shown in exploded view.
Figure 3:
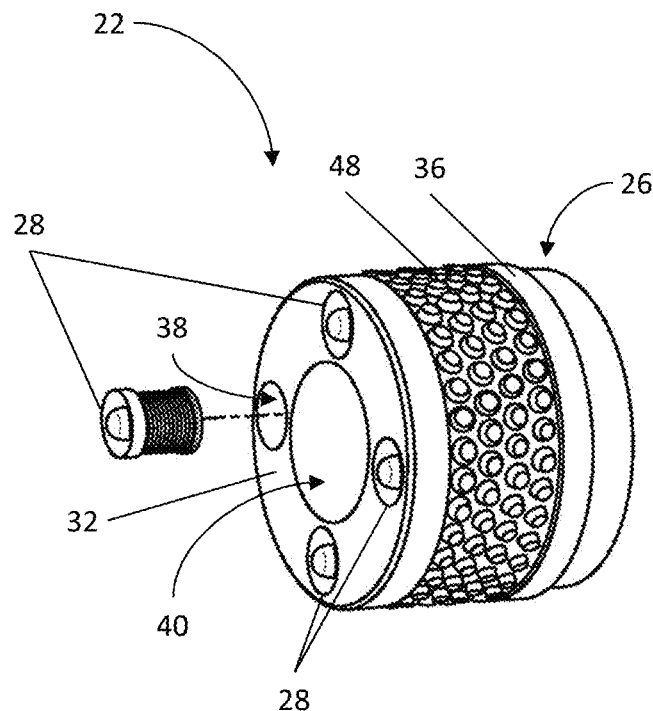
FIG. 3 is a front-side view of the power tool attachment of FIG. 2 with the magnetic rotor omitted and an MLD shown in exploded view.
Figure 4:
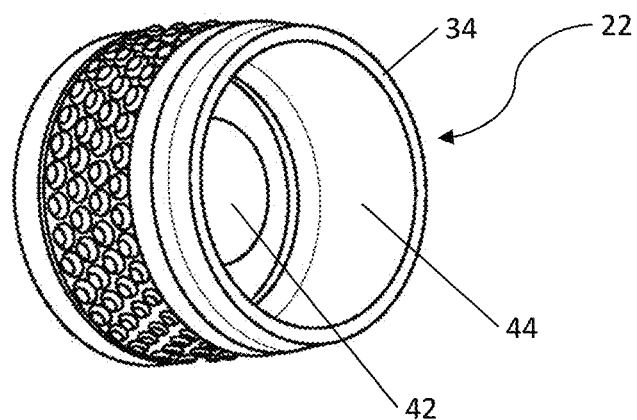
FIG. 4 is a back-side view of the power tool attachment of FIG. 2.

The foregoing summary, as well as the following detailed description of embodiments will be better understood when read in conjunction with the appended drawings. As used herein, an element or feature recited in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the recited elements or features. Moreover, unless explicitly stated to the contrary, examples or embodiments "comprising" or "having" or "including" an element or feature or a plurality of elements or features having a particular property may include additional elements or features, which may not have that property. Also, it will be appreciated that the terms "comprises", "has", "includes" means "including by not limited to" and the terms "comprising", "having" and "including" have equivalent meanings. It will also be appreciated that like reference characters will be used to refer to like elements throughout the description and drawings.

Although the devices disclosed herein are shown and described as powering a light source, it will be appreciated by a person skilled in the art that in other embodiments the devices disclosed herein may power other electrical loads. The devices described below, whether powering light sources or other electrical loads, can be collectively referred to as induction-powered devices. These other electrical loads can include, but are not limited to, surface mounted resistors, Zener diodes, voltage regulators, capacitors, DC integrated circuit chips with full wave bridge AC to DC rectifiers, communications modules such as RFID and Bluetooth chips, communications modules, counting devices, timing devices such as motor-hour-meters, temperature monitoring ICs such as a heat detection thermistor, safety interlocks, chip-on-board (COB) devices, El wiring, surface mount device (SMD), etc.

Turning to FIGS. 1 to 4, a power tool and power tool attachment are shown and generally identified by reference characters 20 and 22, respectively. The power tool has a rotating spindle 24. The power tool attachment 22 comprises a sleeve 26, a plurality of magneto-luminescent devices (MLDs) 28 secured to the sleeve 26 and a multi-pole magnetic rotor 30. In the example shown, the power tool 20 comprises a pneumatic die grinder. Although, a person skilled in the art will appreciate that in other embodiments the power tool attachment described herein can be adapted for use with a wide variety of different power tools (either fluidically driven or electromotor-driven) comprising rotating members, such as spindles.

The sleeve 26 is generally cylindrical and comprises a front face 32, a back face 34 and a circumferential outer surface 36 extending therebetween. A plurality of recesses 38 are defined in the front face 32 for receiving the MLDs 28, and a through-hole 40 is defined within the sleeve 26. The through-hole 40 extends from the front face 32 to the back face 34 along the longitudinal central axis of the sleeve 26. The through-hole 40 comprises a narrow front portion 42, for receiving the spindle 24 of the power tool 20 and the magnetic rotor 30, and an enlarged back portion 44, for securing the power tool attachment 22 to the power tool 20. In the example shown, the enlarged back portion 44 matingly engages a front end 46 of the power tool 20 to secure the power tool attachment 22. In some embodiments, the power tool attachment 22 may be secured to the power tool 20 using a lip over edge interference fit. It will be appreciated that the front end 46 is a working end of the power tool 20. Optionally, a grip 48 is formed on the circumferential outer surface 36 of the sleeve 26. In the example shown, the sleeve 26 is formed of resilient deformable rubber. Although, a person skilled in the art will appreciate that in other embodiments the material may be a thermoplastic elastomer ("TPE") or a material such as aluminium or glass filled mouldable polymer, depending on the application in which the power tool attachment 22 is to be used. The power tool attachment 22 may include an interlocking mechanisms and/or may be threaded to engage the power tool 20.

The magnetic rotor 30 comprises a bushing 50 and a multi-pole magnetic ring 52 secured to the bushing 50. The magnetic ring 52 comprises six poles 54 alternately arranged in a circumferential direction of the magnetic ring 52. The bushing 50 forms an interference fit with the spindle 24 when the bushing 50 is positioned on the spindle 24, such that the bushing 50 and magnetic ring 52 rotate with the spindle 24 to generate an alternating magnetic field when the power tool 20 is operated. This alternating magnetic field can be used to power the MLDs 28 of the power tool attachment 22, as described below.

The MLDs 28 are removably embedded within the recesses 38 in the sleeve 26, adjacent a front end of the sleeve 26, and are equally spaced about a longitudinal central axis of the sleeve 26. The MLDs 28 are identical and are described in detail below.

Although four MLDs 28 and four corresponding recesses 38 are described above in the power tool attachment 22, a person skilled in the art would appreciate that in other embodiments more or fewer than four MLDs 28 and corresponding recesses 38 can be incorporated in the power tool attachment 22. Additionally, in other embodiments the MLDs 28 may not be equally spaced about the longitudinal central axis of the sleeve 26 and can be otherwise oriented or spaced within the sleeve 26. It will be appreciated that the power tool attachment 22 incorporating the MLDs 28 disclosed herein is advantageously flexible in design and a variety of orientations and spacings of the MLDs 28 within the power tool attachment 22 are possible, and the orientation and spacing of the MLDs 28 will depend on the intended application and power tool with which the power tool attachment is to be used. Furthermore, a person skilled in the art would appreciate that in other embodiments the recesses 38 for receiving the MLDs 28 may be through-holes or voids formed in the sleeve 26 to receive the MLDs 28.

Although the through-hole 40 is described as extending along the longitudinal central axis of the sleeve 26, a person skilled in the art will appreciate that in other embodiments the through-hole 40 may be offset from the central axis of the sleeve 26 or may be otherwise positioned within the sleeve 26. Similarly, although the sleeve 26 is shown as being cylindrical and generally symmetric about the longitudinal central axis, a person skilled in the art will appreciate that in other embodiments the sleeve 26 may be formed in a different shape and may not be symmetric. The size and shape of the sleeve 26 and the size and location of the through-hole 40 will depend on the power tool with which the power tool attachment is intended to be used and may also depend on the application for which the power tool attachment is intended to be used. A person skilled in the art will appreciate that the power tool attachment 22 incorporating the MLDs 28 disclosed herein is advantageously flexible in design and may be formed in a variety of shapes and sized suitable to the intended application.

Figure 5:
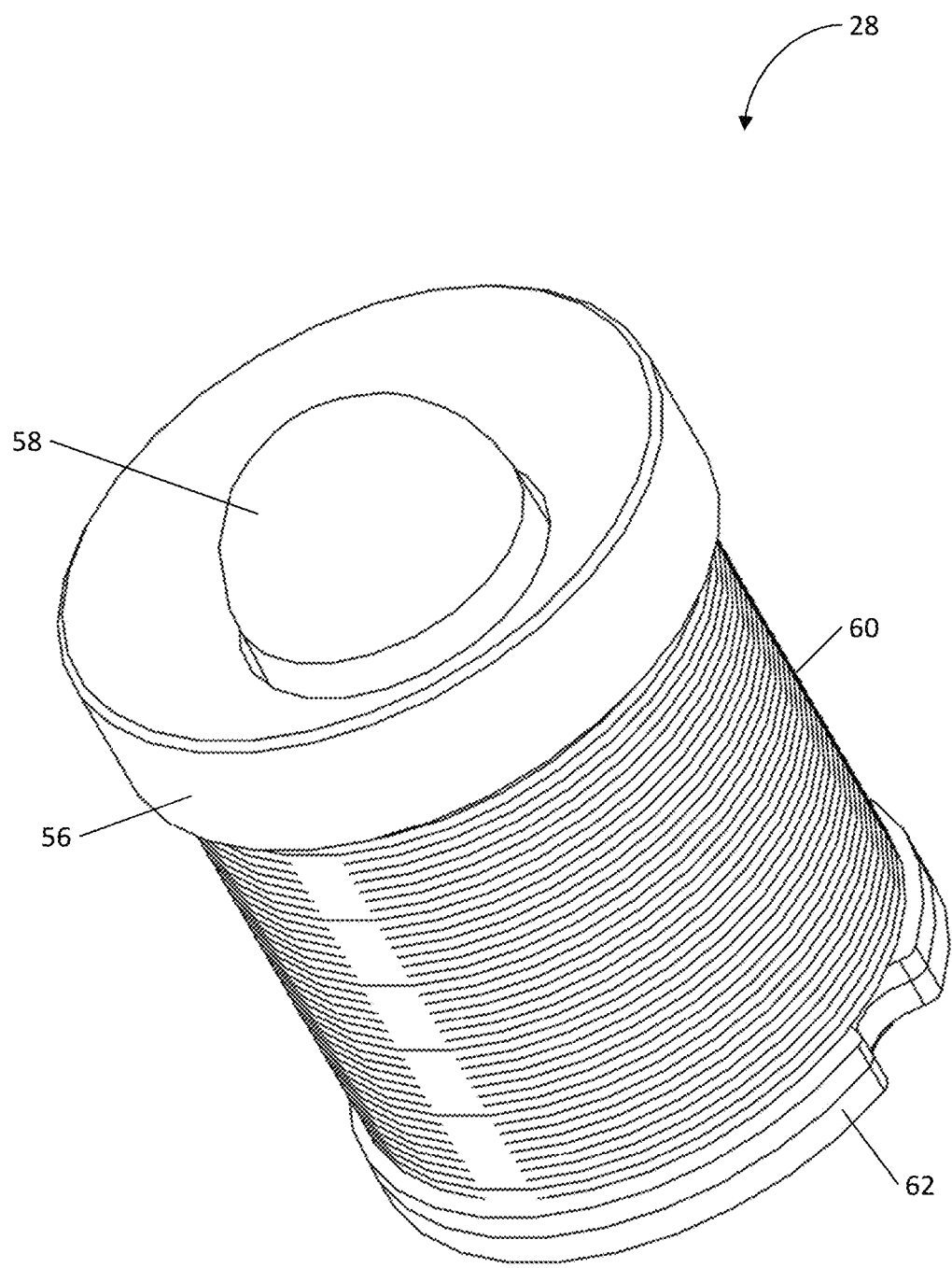
FIG. 5 is an axonometric view of the MLD of the power tool attachment of FIG. 2.
Figure 6:
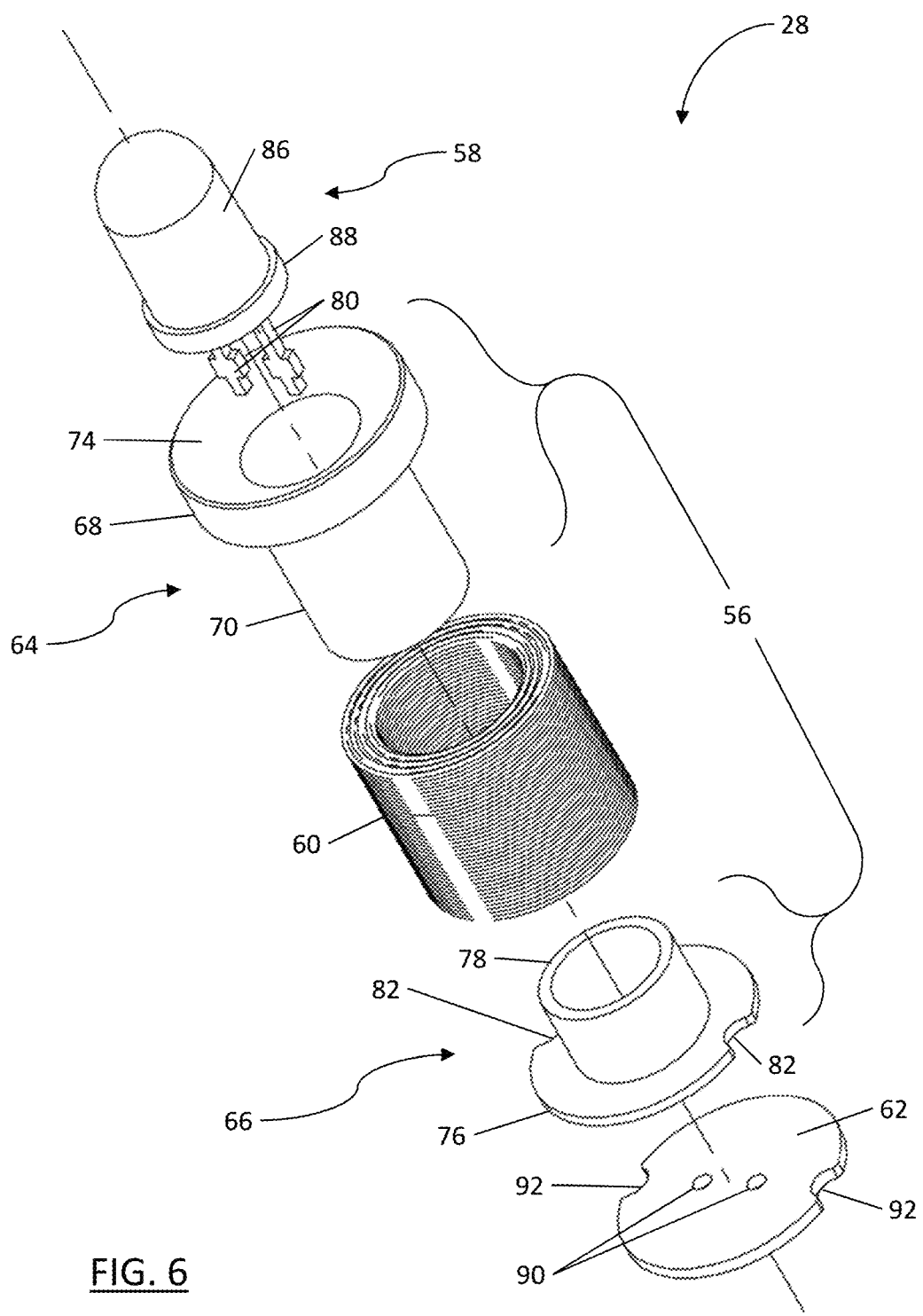
FIG. 6 is an exploded view of the MLD of FIG. 5.
Figure 7:
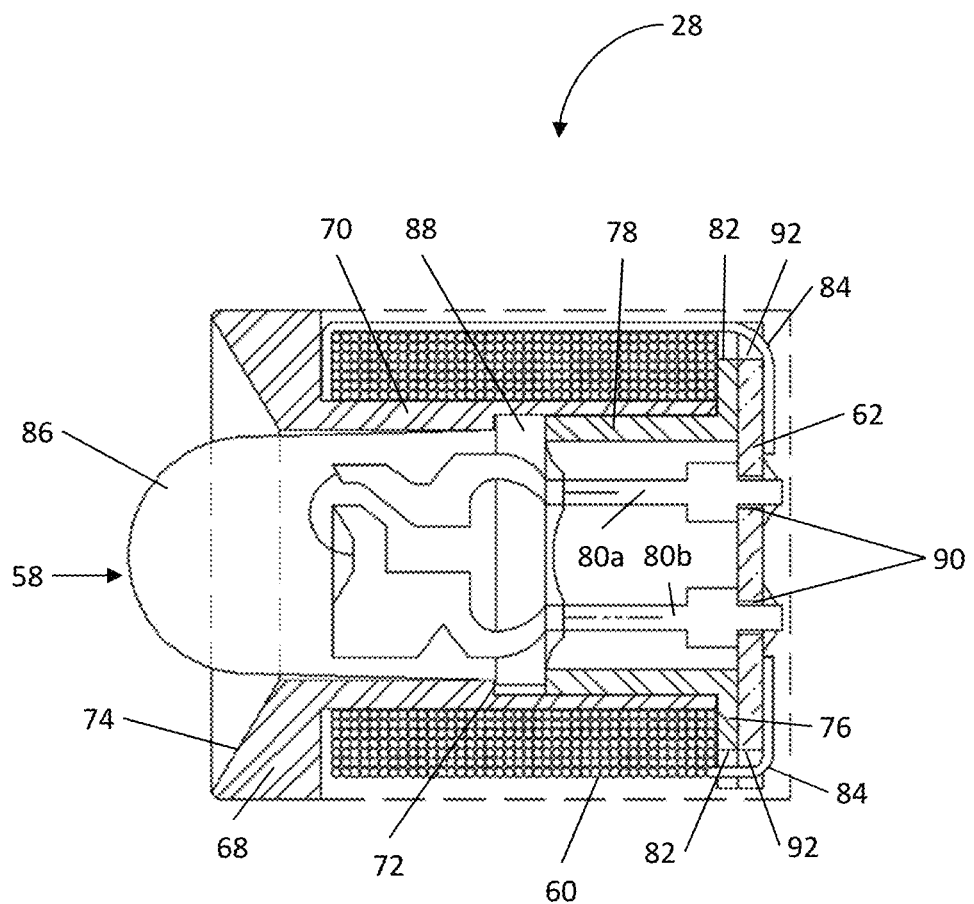
FIG. 7 is a sectional view of the MLD of FIG. 5.

Turning to FIGS. 5 to 7, a single one of the MLDs 28 is shown. The MLD 28 comprises a bobbin 56, a light source 58, a coil 60 and a circuit board 62. When the MLD 28 is assembled, the light source 58 is nested within a core of the bobbin 56 and protrudes from a front end of the bobbin 56, the coil 60 surrounds the core of the bobbin 56 and the circuit board 62 electrically connects the light source 58 to the coil 60 adjacent a back end of the bobbin 56. The MLD 28 is generally cylindrical in shape.

As shown in FIGS. 6 and 7, the bobbin 56 is split into two constituent parts that connect to define a pair of opposing flanges and the core of the bobbin 56 therebetween. These two constituent parts comprise a female bobbin 64 and a male bobbin 66.

The female bobbin 64 comprises a first flange 68 of the pair of opposing flanges and a female core portion 70. The first flange 68 and the female core portion 70 are generally cylindrical. The female core portion 70 is hollow to permit nesting of the light source 58 within the female core portion 70 and includes a shoulder 72 for holding in place the light source 58 when the female core portion 70 is mated with the male bobbin 66, as shown in FIG. 7. The first flange 68 has a countersunk outer face 74 with a depth and diameter for reducing obstruction and improving radial symmetry of light emitted from the light source 58. The female bobbin 70 is made from a ferrous metal with a high magnetic permeability, such as annealed solenoid grade stainless steel, and may be coated with a non-conductive material in whole or in part.

The male bobbin 66 comprises a second flange 76 of the pair of opposing flanges and a male core portion 78 for mating with the female core portion 70. The second flange 76 and the male core portion 78 are generally cylindrical. The male core portion 78 is hollow to permit passage of a pair of leads 80 connecting the light source 58 to the circuit board 62, and the second flange 76 includes a pair of indents 82 to permit passage of a pair of coil leads 84 (shown in FIG. 7 only) connecting the coil 60 to the circuit board 62. The pair of indents 82 are located on an outer edge of the second flange 76. The male bobbin 66 is made from a ferrous metal with a high magnetic permeability, preferably annealed solenoid grade stainless steel, and may be coated with a non-conductive material in whole or in part.

As will be appreciated, the female bobbin 64 and the male bobbin 66 can be connected by mating the male core portion 78 with the female core portion 70 as shown in FIG. 7. To permit mating of the cores, an outer diameter of a mating portion of the male core portion 78 is smaller than an inner diameter of a mating portion of the female core portion 70. The mating portion of the male core portion 78 can be substantially the entire length of the male core portion 78 and the mating portion of the female core portion 70 can be approximately half of the length of the female core portion 70, as shown in FIG. 7. When mated, the first flange 68 and the second flange 76 define the pair of opposing flanges of the bobbin 56 and the male core portion 78 and the female core portion 70 define the core of the bobbin 56.

The light source 58 comprises a light emitting diode (LED) having a body 86 and the pair of leads 80. The body 86 comprises a flange 88 near a base of the body 86 and the leads 80 extend from the base, adjacent the flange 88. The leads 80 comprise an anode lead 80a and a cathode lead 80b. When sufficient voltage from the coil 60 is present at the anode lead 80a, charge passes through the LED to the cathode lead 80b, releasing photons from the light source 58 to illuminate the surrounding environment. In the presently described embodiment, the light source 58 produces from 16 to 26 lumens of light when a voltage of 2.5 to 5 volts is applied across the leads 80.

The coil 60 comprises a number of turns of wire ending in the pair of coil leads 84 (shown in FIG. 7 only). When the coil 60 is exposed to an alternating magnetic field, an electromotive force and corresponding electric current is induced in the coil 60. This induced electricity can be used to power the light source 58 when sufficiently strong. The alternating magnetic field can be supplied by a magnetic rotor having multiple poles, such as the magnetic rotor 30 described above or a multi-magnet ring assembly, concentrically coupled to a rotating member of a power tool, such as power tool 20. The magnetic rotor can be coupled to the rotating member of the power tool by interference fit, adhesive, threading and/or set-screw fastener. In other embodiments, the alternating magnetic field can be supplied through other sources, such as environmental sources, as described below. In the presently described embodiment, the coil 60 comprises from 250 to 500 turns of magnet wire having a diameter of approximately 0.004 to 0.007 inches and, when exposed to an alternating magnetic field having an intensity of approximately 500 to 1500 AC gauss (0.05 to 0.15 Tesla), the coil 60 generates the voltage of 2.5 to 5 volts necessary to power the light source 58. The wire of coil 60 is coated with a non-conductive coating to inhibit short-circuiting of the coil 60. In some embodiments, an insulating sleeve can be used between the core and coil to inhibit short-circuiting. In yet further embodiments, the coating may comprise a bonding agent to bond the windings of coil 60 together and inhibit unraveling. This bonding agent may be activated by an activating agent such as acetone or alcohol. Additionally, the coil and back end of the MLD 28 can be potted (as shown in dashed lines in FIG. 7) to inhibit unravelling and protect against vibrations and abrasion. The potting can be a non-conductive compound such as epoxy or silicone.

The circuit board 62 is generally circular and comprises conductive traces (not shown) for connecting the leads 80 of the light source 58 to the coil leads 84. The circuit board 62 has a pair of holes 90 located near a center of the circuit board 62, for inserting the leads 80, and a pair of indents 92 located at the edge of the circuit board 62, to permit passage of the coil leads 84. The circuit board 62 can be a multi-layered circuit board or a printed circuit board (PCB) of copper clad FR-4, ceramic or other material known in the art, and can include a variety of electronic components (not shown) for conditioning the voltage and current generated by the coil 60, for controlling the light source 58 and/or for other electronic purposes known in the art.

As shown in FIG. 7, when the MLD 28 is assembled, the coil 60 surrounds the core of the bobbin 56 and the circuit board 62 is located adjacent the second flange 76 of the male bobbin 66, near the back end of the bobbin 56. The circuit board 62 electrically connects the light source 58 to the coil 60. Additionally, the body 86 of the light source 58 is nested within the female core portion 70 and the leads 80 of the light source 56 are nested within the male core portion 78. Although, a portion of the body 86 and the leads 80 protrude beyond the cores 70 and 78, respectively, as shown in FIG. 7. When the male core portion 78 and the female core portion 70 are mated, the flange 88 of the light source 58 is held in place by and abuts the shoulder 72 of the female bobbin 64 on one side and a front end of the male core portion 78 on the other side. This engagement of the light source 58 by the female bobbin 64 and the male bobbin 66, within the core of the bobbin 56, at least partially secures the light source 58 against vibrations.

As will be appreciated, providing the bobbin 56 in two constituent parts (female bobbin 64 and male bobbin 66) facilitates assembly and flexibility of the design of the MLD 28. That is, the constituent parts can initially be separate and at least one of the opposing flanges can be disconnected from at least a portion of the core of the bobbin 56. This arrangement allows for the coil 60 to be wound separately from the bobbin 56 and thereafter positioned around at least a portion of the core of the bobbin 56 as the MLD 28 is assembled. In the present example, by providing the female bobbin 64 and the male bobbin 66 as initially separate parts, the second flange 76 of the male bobbin 66 is disconnected from the female core portion 70, which allows the coil 60 to be slid over the female core portion 70 without interference from the second flange 76. Thereafter, the male bobbin 66 can be mated with the female bobbin 64 to define the bobbin 56 and retain the coil 60 around the core of the bobbin 56, between the opposing first and second flanges 68 and 76, respectively. As will be appreciated, this bobbin arrangement permits the same bobbin design to be used with a variety of different coils, which may have a variety of different coil specifications such as the number of turns, the material and the thickness of the wire. In turn, this can help to improve the flexibility of the design of the MLD 28 and, correspondingly, the flexibility of the design of power tools and power tool accessories incorporating the MLD 28.

In operation, the MLD 28 is positioned within an alternating magnetic field, which can be generated by a multi-pole magnetic rotor attached to a sufficiently high-rpm rotating member of a power tool or power tool attachment, as described above. When placed in the alternating magnetic field, an electric current is induced in the coil 60 of the MLD 28 and the MLD 28 acts as an electro-magnetic stator to power the light source 58 via the circuit board 62, as described above. As will be appreciated, when the alternating magnetic field is generated by a magnetic rotor, such as magnetic rotor 30, the frequency of the alternating magnetic field will depend on factors such as the arrangement and number of poles of the magnetic rotor and the speed of the rotating member of the power tool, while the intensity of the magnetic field will depend on factors such as the strength of the magnets in the magnetic rotor and a gap dimension between the magnetic rotor and the MLD 28. As the gap dimension increases the intensity of the alternating magnetic field decreases. For example, using a multi-pole magnetic rotor with 12 poles arrange in six pairs aligned with an axis of rotation of the rotor can generate an alternating magnetic field with a frequency ranging from 1000 to 1200 Hz when connected to a member rotating at a speed of 10,000 to 12,000 rpm, which may be a typical speed for a spindle of a die grinder. This alternating magnetic field can have an intensity of about 500 to 1500 AC gauss (0.05 to 0.15 Tesla) at a gap of 0.1 to 0.25 inches. The coil 60 of the MLD 28 may produce a voltage of 2.5 to 5 volts when located within such an alternating magnetic field, which is sufficient to illuminate the light source 58 when consisting of the LED.

As will be appreciated, the frequency and intensity of the alternating magnetic field required to power the light source 58 will depend on the arrangement of the MLD 28 such as the type of light source 58 used, the magnetic permeability of the bobbin 56, the specifications of the coil 60 (such as the number of turns, the material and the thickness of the wire) and the configuration of the circuit board 62. Accordingly, the MLD described herein can be adapted for use in a variety of environments and applications by a person skilled in the art. For example, in some embodiments the MLD 28 or a plurality of the MLDs 28 may be used to illuminate a working surface in proximity to a power tool and/or a power tool attachment, such as the power tool 20 and power tool attachment 22 described above. In yet further embodiments, one or more of the MLD 28 may be used to provide accent lighting for the housing of the power tool and/or power tool attachment, for example to illuminate indicia or backlight a nameplate or other logo (which could include a safety logo for electro-motor stray emf).

As will be further appreciated, the modular nature of the MLD described herein beneficially provides a flexible design that can be modified in some elements to accommodate a wide variety of applications while permitting unmodified elements to be reused from one design to the next, thus encouraging the cost savings of mass production. Additionally, the compact structure of the MLD described herein saves space and facilitates placing the MLD closer to the source of the alternating magnetic field where the magnetic field is stronger, thus permitting less robust coils and less magnetically permeable bobbin materials to be used.

Figure 8:
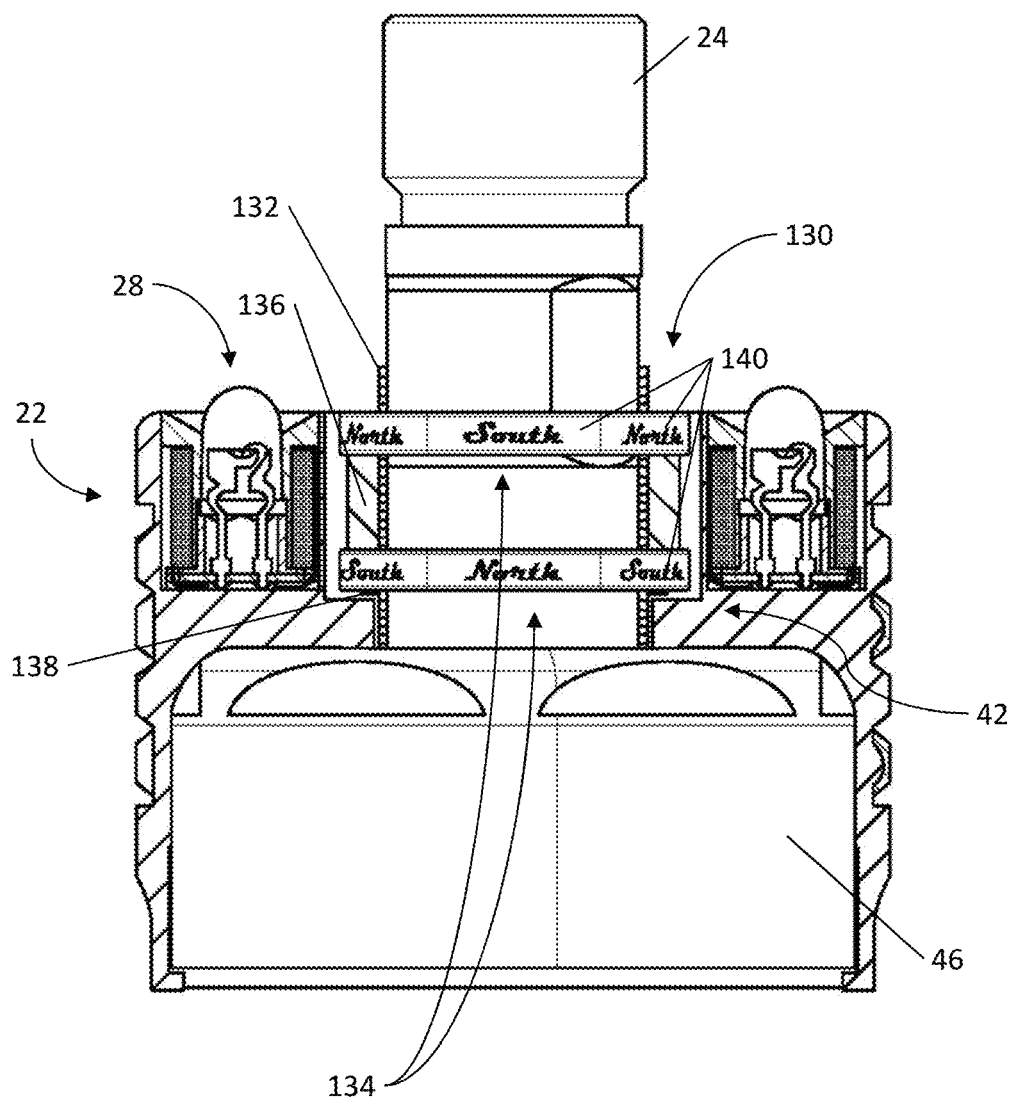
FIG. 8 is a partial sectional view of the sleeve and MLDs of the power tool attachment of FIG. 2 taken along a longitudinal axis of the power tool, a spindle, a front end of the power tool and an alternative dual-ring magnetic rotor are shown.

Turning to FIG. 8, which shows a partial sectional view of the power tool attachment 22 taken along its longitudinal axis and comprising an alternative embodiment of a multi-pole magnetic rotor generally identified by reference numeral 130. The magnetic rings of the magnetic rotor are shown without sectioning. The spindle 24 and the front end 46 of the power tool 20 are also shown without sectioning, while the remainder of the power tool 20 is omitted.

The magnetic rotor 130 is a dual-ring magnetic rotor and comprises a bushing 132, a pair of magnetic rings 134 and a ring spacer 136. The magnetic rings 134 and the spacer 136 are secured to the bushing 132, and the bushing 132 comprises a flange 138 to position the rings 134 and the spacer 136. Each of the magnetic rings 134 comprises six poles 140 alternately arranged in a circumferential direction of each magnetic ring 134, and the magnetic rings 134 are rotationally offset about a rotational axis of the magnetic rotor 130 such that opposite poles 140 of the magnetic rings 134 are aligned in the direction of the rotational axis.

When the power tool attachment 22 is secured on the power tool 20, the magnetic rotor 130 is nested within the narrow front portion 42 of the through-hole 40 of the power tool attachment 22, such that the MLDs 28 of the power tool attachment 22 concentrically surround the magnetic rotor 130 in close radial proximity. The bushing 132 forms an interference fit with the spindle 24, such that the magnetic rotor 130 rotates with the spindle 24. The flange 138 locates one of the magnetic rings 134 proximate one end of the MLDs 28, near a flange of the bobbin in the MLDs 28, while the spacer 136 locates the other of the magnetic rings 134 proximate an opposite end of the MLDs 28 near an opposite flange of the bobbin in the MLDs 28. In the embodiment shown in FIG. 8, one of the magnetic rings 134 is aligned in a plane defined by the flanges at one end of the MLDs 28 (for example, the first flanges 68 of the female bobbins 64), while the other magnetic ring 134 is aligned in a second plane defined by the flanges at the opposite end of the MLDs 28 (for example, the second flanges 76 of the male bobbins 66). It has been found that aligning the magnetic rings 134 with the opposing flanges of the MLDs 28, as described above, tends to improve performance of the MLD.

As the spindle 24 rotates during operation of the power tool 20, the magnetic rings 134 rotate and produce an alternating magnetic field, which is used to power the MLDs 28 as described above. As will be appreciated, by locating the MLDs 28 in close proximity to the magnetic rings 134 and by rotationally offsetting the magnetic rings 134, such that opposite poles 140 are axially aligned and proximate opposite ends of each bobbin 56 in the MLDs 28 (as shown in FIG. 8), sufficient electric current can be induced in the coils 60 of the MLDs 28 to power the light sources of the MLDs 28 using relatively small low-strength magnetic rings and at relatively low rotational speeds. The embodiments described herein can, therefore, beneficially provide costs and space savings with a flexible design that can be modified to be used in a wide variety of applications.

Additionally, by aligning the magnetic rotor 130, light sources 58 of the MLDs 28 and coils 60 of the MLDs 28 in a common plane that is perpendicular to the rotational axis of the magnetic rotor 130, the length added to the front end 46 of the power tool 20 by the power tool attachment 22 is small. As will be appreciated, this can beneficially allow the power tool attachment 22 to be used without requiring an extension to the spindle 24, retrofitting of the power tool 20 or incorporating of the magnetic rotor 130 into the internal workings of the power tool 20, all of which can help to reduce costs and increase simplicity. Additionally, locating the power tool attachment 22 on the outside of the power tool 20 can eliminate the limitation that the power tool housing be non-ferrous material, which may be required for power tool attachments that rely on a magnetic rotor within the power tool.

Although an array of four MLDs 28 has been shown and described in the above embodiments, a person skilled in the art will appreciate that in other embodiments the power tool attachment 22 can comprise more or fewer than four MLDs 28. Additionally, in other embodiments the MLDs 28 may not concentrically surround the magnetic rotor 30, 130 and can be otherwise oriented or spaced within the power tool attachment 22. A person skilled in the art will appreciate that the power tool attachment 22 incorporating the MLDs 28 and the magnetic rotor 30, 130 disclosed herein is advantageously flexible in design and a variety of orientations and spacings of the MLDs 28 are possible. The orientation and spacing of the MLDs 28 will depend on the intended application and power tool with which the power tool attachment is to be used. As will be appreciated, in embodiments with only one MLD 28, the MLD can be adjacent the magnetic rotor in a common plane that is perpendicular to the rotational axis of the magnetic rotor, when the power tool attachment is secured to the power tool.

Although the magnetic rings have been described as being located in proximity to, in alignment with, or in a plane defined by, the flanges 68, 76 of the MLDs 28, a person skilled in the art will appreciate that in other embodiments the magnetic rings 134 may be located between the planes defined by the flanges 68, 76 of the MLDs 28 and/or the magnetic rings 134 may be slightly offset with respect to the planes defined by the flanges 68, 76 of the MLDs 28. In some embodiments the magnetic rings 134 may be in a plane defined by only a few, or one, of the MLDs 28. In yet other embodiments, the magnetic rings 134 may be located in planes defined by the ends of the coils 60 in the MLDs 28, the ends of the bobbins 56 in the MLDs 28 (for example, where the bobbins do not include flanges at their ends) or by the ends of the MLDs 28 themselves. In some embodiments, the magnetic rings 134 may be located in close proximity to these ends. In yet other embodiments, the magnetic rings 134 may be located directly adjacent each other and the spacer 136 may be omitted. A person skilled in the art will appreciate that, similar to the MLD described above, the magnetic rotor of the power tool attachment is flexible in design and may be used in a wide variety of applications.

Although the magnetic rotor 130 has been shown and described as comprising two magnetic rings 134 each having six poles 140 in the above embodiment, a person skilled in the art will appreciate that in other embodiments the magnetic rotor 130 can comprise more or less than two magnetic rings 134 with a greater or lesser even number of poles 140. Additionally, the magnetic rotor 130 may comprise other shapes of magnets (such as magnetic bars, cylinders, wedges, arcs, sections, rectangles, buttons or disks) in addition to, or instead of, the magnetic rings 134. In some embodiments, the magnetic rotor 130 may comprise a single piece multi-pole magnet or may comprise an assembly of magnets in an alternating polar array on a non-magnetic framework, such as a non-magnetic ring (for example, a T7075 aluminium ring). The assembly of magnets may be sintered to the non-magnetic framework. In some embodiments, the magnetic rotor 130 may be moulded out of plastic containing particles for magnetization, such as particles of NdFeB that are magnetized during the moulding process. The number, shape, poles and orientations of the magnets as well as their magnetic strengths will depend on the intended power tool attachment, power tool and MLDs with which the magnetic rotor 130 is to be used.

Figure 9C:
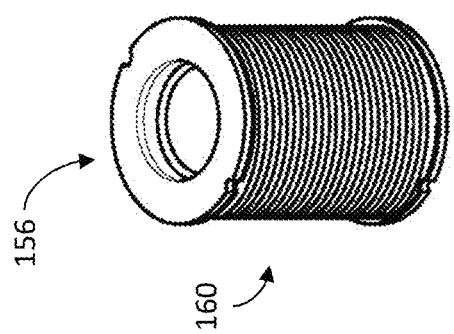
FIGS. 9a to 9c are assembly views of a bobbin and coil for an MLD.
Figure 9B:
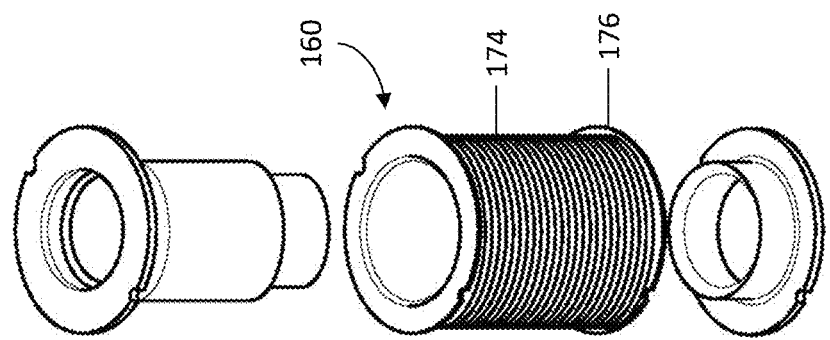
Figure 9A:
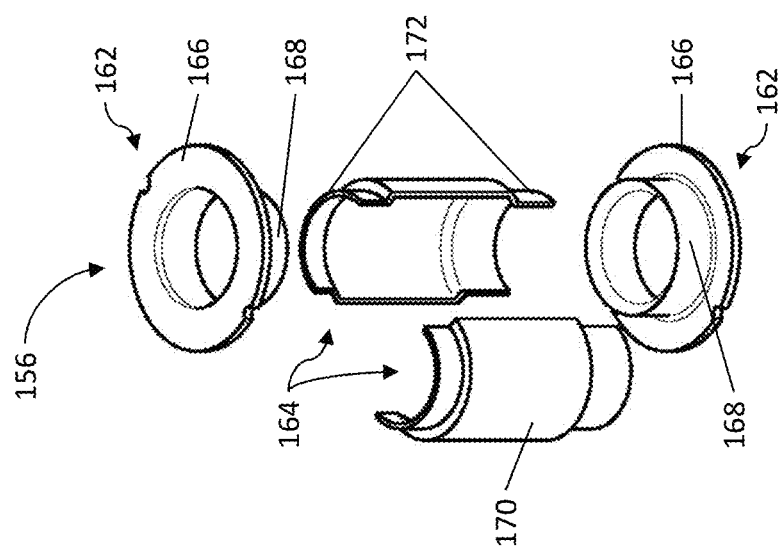

Turning to FIGS. 9a to 9c, a bobbin and a coil for an MLD are shown and generally identified by reference characters 156 and 160, respectively.

The bobbin 156 is similar to the bobbin 56 previous described. However, the bobbin 156 is split into four constituent parts that connect to define a pair of opposing flanges and a core of the bobbin 156. The four constituent parts comprise a pair of opposing flanged parts 162 and a pair of axially split core parts 164. Each of the flanged parts 162 includes a flange 166 of the pair of opposing flanges and an axially extending central portion 168. Each of the core parts 164 includes an expanded core portion 170 and a pair of opposing narrowed end portions 172. The central portions 168 are hollow and the narrowed end portions 172 matingly engage with the central portions 168 of adjacent flanged parts 162 to define the bobbin 156.

The coil 160 comprises a number of turns of wire 174, which is similar to that previously described, and a hollow winding spool 176. The wire 174 is wound around the spool 176 prior to assembling the bobbin 156 and the coil 160 is slid over the constituent parts 162, 164 as the bobbin 156 is assembled. Winding the coil 160 separately facilitates customization and assembly of the MLD. The winding spool 176 can be formed of plastic or other suitable material that would be appreciated by a person skilled in the art.

Figure 10B:
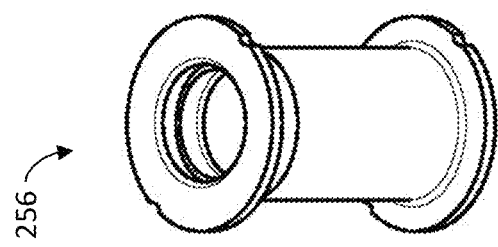
FIGS. 10a and 10b are assembly views of a bobbin for an MLD.
Figure 10A:
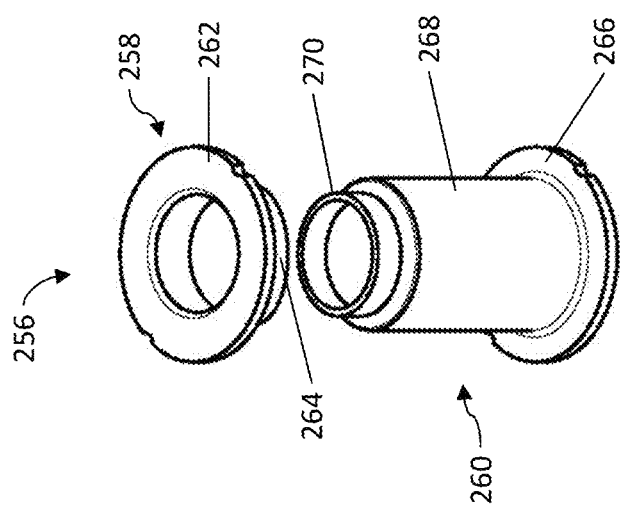

Turning to FIGS. 10a and 10b, a bobbin for an MLD is shown and generally identified by reference character 256. The bobbin 256 is similar to the bobbin 56 previous described and is split into two constituent parts that connect to define a pair of opposing flanges and a core of the bobbin 256. However, the constituent parts of the bobbin 256 are shaped differently than those of the bobbin 56. The two constituent parts of the bobbin 256 comprise a female flanged part 258 and a male bobbin 260. The female flanged part 258 includes a first flange 262 of the pair of opposing flanges and an axially extending central portion 264. The male bobbin 260 includes a second flange 266 of the pair of opposing flanges, an elongate axially extending core portion 268 and a narrowed end portion 270, opposite the second flange 266. The central portion 264 of the female flanges part 258 is hollow and the narrowed end portion 270 matingly engages with the central portion 264 to define the bobbin 256.

Figure 11B:
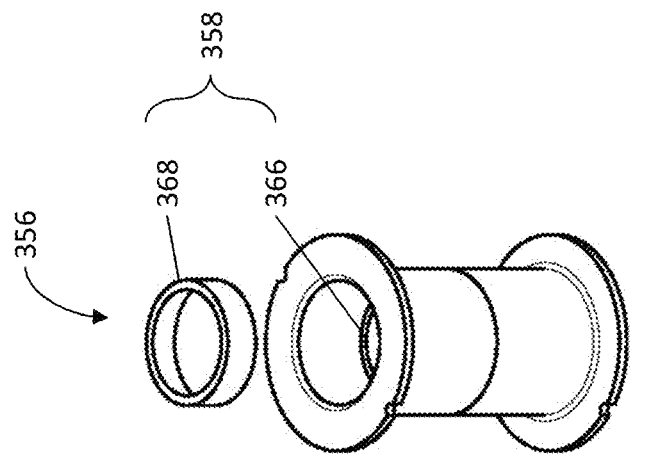
FIGS. 11a and 11b are assembly views of a bobbin and a pair of inserts for an MLD.
Figure 11A:
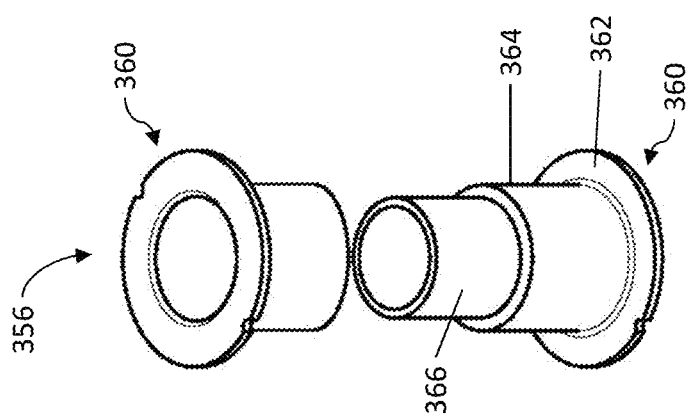

Turning to FIGS. 11a and 11b, a bobbin and a pair of inserts for an MLD are shown and generally identified by reference characters 356 and 358, respectively.

The bobbin 356 is similar to the bobbin 56 previous described and is split into two constituent parts that connect to define a pair of opposing flanges and a core of the bobbin 356. However, in contrast to the bobbin 56, the constituent parts of the bobbin 356 are identical. Each constituent part of bobbin 356 comprises a half-bobbin 360 that includes a flange 362 of the pair of opposing flanges and an axially extending core portion 364, which is hollow. When the half-bobbins 360 are connected to define the bobbin 356, adjacent ends of the core portions 364 abut.

The pair of inserts 358 comprises an elongate connecting insert 366 and an annular retaining insert 368. Both inserts 358 are hollow, generally cylindrical and sized to form an interference fit with the inner surfaces of the core portions 364 of the half-bobbins 360. When the bobbin 356 is assembled, the connecting insert 366 forms an interference fit with the inner surfaces of the adjacent half-bobbins 360 to connect the half-bobbins 360 and define the bobbin 356. If an LED is nested within the core of the bobbin 356, the retaining insert 368 and the connecting insert 366 can abut the LED, to position and retain the LED.

Turning to FIGS. 12 and 13, a power tool is shown and generally identified by reference character 420. The power tool 420 comprises a body 422, a rotatable spindle 424 extending from the body 422 and having a lock nut at its distal end, a multi-pole magnetic rotor 430 and a plurality of MLDs 428 secured to the body 422. The magnetic rotor 430 is secured to the spindle 424 and, in the example shown, the MLDs 428 surround the magnetic rotor 430 and are embedded within a front end 426 of the body 422. It will be appreciated that the front end 426 of the body 422 is a working end of the power tool 420. In the example shown, the MLDs 428 are equally circumferentially spaced about a longitudinal central axis of the magnetic rotor 430 and surround the magnetic rotor 430.

The MLDs 428 of the present example function electrically similarly to the MLDs 28 previously described. The MLDs 428 each comprise a bobbin 432, a light source 434 and a coil 436. In contrast to the previously described embodiments, the MLDs 428 do not comprise a circuit board and the leads 438 of the light source 434 are directly connected to the leads (not shown) of the coil 436. Additionally, in the MLDs 428: the light source 434 is located adjacent a front end of the bobbin 432 and is not nested within the bobbin 432; the leads 438 of the light source 434 are embedded within non-conductive inserts 440; and the bobbin 432 is unitary and not split into two constituent parts.

The magnetic rotor 430 of the present example functions similarly to the magnetic rotors 30, 130, previously described. However, in the example shown, the magnetic rotor 430 is a six-bar magnetic rotor and comprises a bushing 442 and six magnetic bars 444 secured to the bushing 442 and equally circumferentially spaced about the axis of rotation of the bushing 442. The bushing 442 forms an interference fit with the spindle 424, such that the magnetic rotor 430 rotates with the spindle 424. Each magnetic bar 444 comprises a pair of opposite poles 446 that are located in alternating arrangement with the poles 446 of adjacent magnetic bars 444 on the bushing 442. When the power tool 420 is operated, the magnetic rotor 430 rotates with the spindle 424 and generates an alternating magnetic field. This alternating magnetic field can be used to power light sources 434 of the MLDs 428 via the coils 436, as described above.

As will be appreciated, the power tool 420 of the example shown is exemplary and the MLDs 428 and magnetic rotor 430 can be adapted for use with a wide variety of power tools comprising rotating spindles or other rotating members.

Although an array of four MLDs 428 has been shown and described in the above embodiment, a person skilled in the art will appreciate that in other embodiments the power tool can comprise more or fewer MLDs 428. Additionally, in other embodiments the MLDs 428 may not be equally spaced about the longitudinal central axis of the magnetic rotor 430 and can be otherwise oriented or spaced within the power tool 420. A person skilled in the art will appreciate that the power tool 420 incorporating the MLDs 428 and the magnetic rotor 430 disclosed herein is advantageously flexible in design and a variety of orientations and spacings of the MLDs 428 are possible. The orientation and spacing of the MLDs 428 will depend on the intended application and power tool being used. Furthermore, in yet other embodiments, the MLD 428 may be identical to the MLDs 28 previously described and may comprise a circuit board and bobbin with a plurality of constituent parts, including the female and male bobbins described above.

Although the magnetic rotor 430 has been described in the above embodiment as comprising six magnetic bars 444 each having two poles 446, a person skilled in the art will appreciate that in other embodiments the magnetic rotor 430 can comprise more or less than six magnetic bars 444 with a greater or lesser even number of poles 446. Additionally, the magnetic rotor 430 may comprise other types of magnets (such as magnetic rings, cylinders, wedges, arcs, sections, rectangles, buttons or disks) in addition to, or instead of, the magnetic bars 444. In some embodiments, the magnetic rotor 430 may be identical to the magnetic rotors 30, 130, previously described. In some embodiments, the magnetic rotor 430 may comprise a single piece magnet or may comprise an assembly of magnets in an alternating polar array on a non-magnetic framework, such as a non-magnetic ring (for example, a T7075 aluminium ring). The assembly of magnets may be sintered to the non-magnetic framework. In some embodiments, the magnetic rotor 430 may be moulded out of plastic containing particles for magnetization, such as particles of NdFeB that are magnetized during the moulding process. A person skilled it the art will appreciate that the number, shape, poles and orientations of the magnets as well as their magnetic strengths will depend on the intended power tool and MLDs with which the magnetic rotor 430 is to be used.

Although the bushings are described as forming an interference fit with the spindle of the power tool in the above embodiments, a person skilled in the art will appreciate that in other embodiments the bushing may be bonded to the spindle, or to another rotating member of the power tool, or otherwise secured to the rotating member as known in the art.

Figure 14:
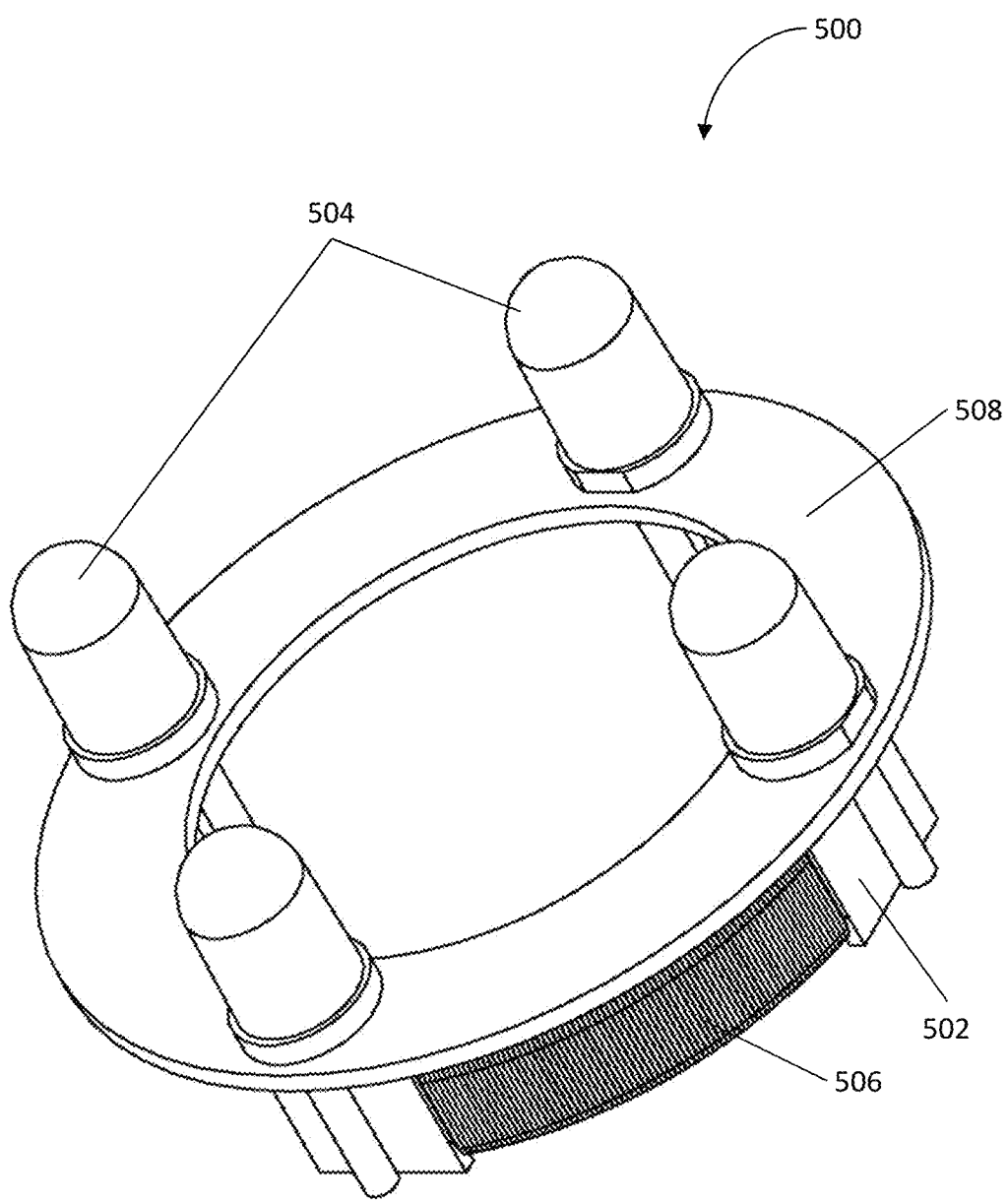
FIG. 14 is an axonometric view of an MLD.
Figure 15:
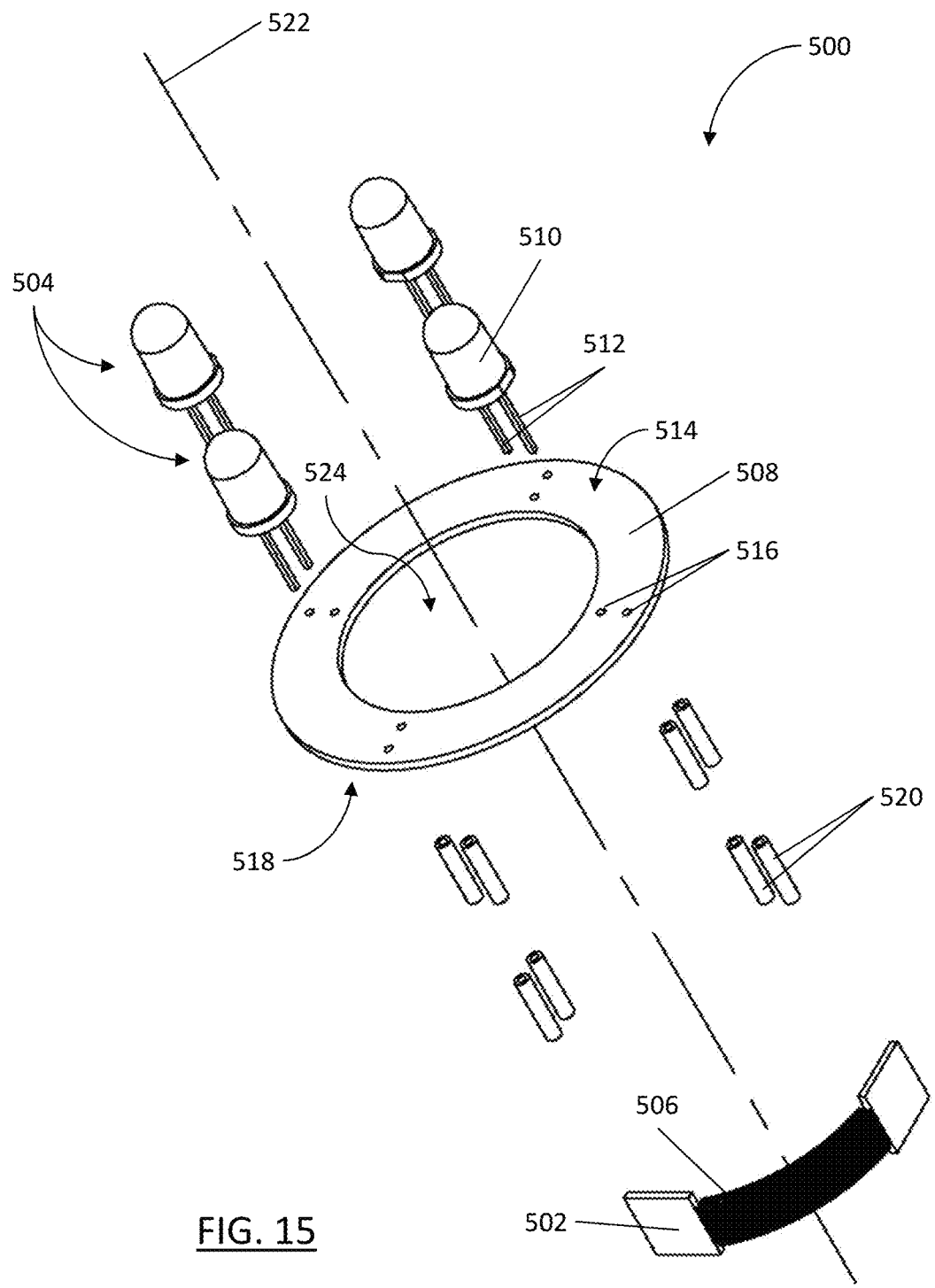
FIG. 15 is an exploded view of the MLD of FIG. 14.

Turning to FIGS. 14 and 15, an MLD is shown and generally identified by reference character 500. The MLD comprises an elongate core 502, a plurality of light sources 504, a coil 506 and a circuit board 508. The light sources 504 are secured to the circuit board 508, the core 502 is secured to the light sources 504, the coil 506 surrounds the core 502 and the circuit board 508 electrically connects the light sources 504 to the coil 506, via traces on the circuit board 508 (not shown).

Each of the light sources 504 comprises a LED having a body 510 and a pair of leads 512 extending from the body 510. When the MLD 500 is assembled, the body 510 is secured adjacent a front side 514 of the circuit board 508 and the leads 512 extend through holes 516 in the circuit board 508 to a back side 518 of the circuit board 508. A portion of each lead 512 extending from the back side 518 of the circuit board 508 is covered by an insulator 520, such as a thin plastic tube, to inhibit short-circuiting of the MLD 500. The insulated portions of the leads 512 that are located adjacent the core 502 are secured to the core 502. In this way, the core 502 and the coil 506 are secured to the circuit board 508 via the insulated portions of the leads 512 and adjacent the back side 518 of the circuit board 508. As would be appreciated by a person skilled in the art, the insulated portions of the leads 512 can be secured to the core 502 by hot glue, epoxy or other suitable bonding method.

The core 502 is made from a ferrous metal with a high magnetic permeability, such as 3% silicon cold-rolled grain-oriented ("CRGO") electrical steel, and may be coated with a non-conductive material in whole or in part. The core 502 is generally I-shaped with a narrow center portion extending lengthwise between opposing end portions. The rolled grain direction of the core 502 extends in the lengthwise direction of the narrow center portion. The coil 506 surrounds the narrow center portion of the core 502, and the insulated portions of the leads 512 are secured to the opposing end portions of the core 502. The core 502 extends a quarter-turn around a central axis 522 of the MLD 500 and is secured between the leads 512 of two adjacent light sources 504 in the MLD 500.

The coil 506 comprises a number of turns of wire ending in a pair of coil leads (not shown), which are electrically connected to the circuit board 508. When the coil 506 is exposed to an alternating magnetic field, the induced voltage and current can be used to power the light sources 504 of the MLD 500, as previously described. In the example shown, the coil 506 comprises approximately 200 turns of magnet wire having a diameter of approximately 0.004 to 0.007 inches and is coated with a non-conductive coating to inhibit short-circuiting of the coil 506. As described above, in some embodiments this coating may comprise a bonding agent to bond the windings of the coil 506 together and inhibit unravelling.

The circuit board 508 is arcuate and generally annular. The circuit board 508 comprises conductive traces (not shown) for connecting the leads 512 of the light sources 504 to the leads of the coil 506. The circuit board 508 comprises a plurality of circumferentially spaced holes 516 for inserting the leads 512 of the light sources 504. Although, in other embodiments the leads 512 could pass around the edge of the circuit board 508 or through indents rather than holes 516. The circuit board 508 also comprises a central opening 524 for receiving a multi-pole magnetic rotor (not shown). The circuit board 508 can be a multi-layered circuit board or a printed circuit board (PCB) of copper Glade FR-4, ceramic or other material known in the art, and can include a variety of electronic components (not shown) for conditioning the voltage and current generated by the coil 506, for controlling the light sources 504 and/or for other electrical purposes known in the art. In some embodiments, the circuit board 508 may comprise a microchip, such as a low VF Schottky bridge, for rectifying full wave alternating current (AC) output from the coil 506 to pure direct current (DC) to the light sources 504 such that light is emitted during a full wave of AC generated by the coil 506. In some embodiments, the circuit board 508 may be configured to alternately pulse groups of the light sources 504 to provide generally uninterrupted luminescence from the combined array of light sources 504 during a full wave of AC generated by the coil 506.

In operation, the assembled MLD 500 is incorporated into either a power tool attachment or into a front end of a power tool, similar to the previously described embodiments. In some embodiments the MLD 500 can be embedded in a sleeve of the power tool attachment or embedded in the body of the power tool, as described above. In some embodiments, a magnetic rotor comprising a four-pole magnetic ring can be located adjacent the coil 506 and connected to a rotatable spindle of the power tool. As the spindle rotates during operation of the power tool, the magnetic rotor rotates and produces an alternating magnetic field, which is used to power the MLD 500 as described above. As will be appreciated, the compact arrangement of the MLD 500 can beneficially enable the MLD 500 to be incorporated in a power tool attachment or front end of a power tool without requiring an extension to the spindle, retrofitting of the power tool or incorporating of the magnetic rotor into the internal workings of the power tool, all of which can help to reduce costs.

Although the core 502 is shown and described as extending a quarter turn around the central axis 522 of the MLD 500, a person skilled in the art will appreciate that in other embodiments the core 502 may extend more or less than a quarter-turn around the central axis 522. For example, the core 502 may extend a half-turn around the central axis 522 or an eighth of a turn around the central axis 522. The length the core 502 extends around the central axis 522, also known as the core's arc length, can depend on the configuration of the magnetic rotor used with the core 502. Spacing the ends of the core 502 to align with opposite magnetic poles (such as adjacent opposite magnetic poles) of the magnetic rotor can help to increase the voltage generated by the coil and facilitate powering of the MLD 500. Similarly, although the core 502 is shown and described as being secured between the leads 512 of two adjacent light sources 504 in the MLD 500, a person skilled in the art will appreciate that in other embodiments the core 502 may be connected to the leads 512 of only one light source 504, may be connected between the leads 512 of a plurality of light sources 504, may be connected directly to the circuit board 508 and/or may be connected to the circuit board 508 by another element of the MLD 500.

Although the core 502 has been described as being made from 3% silicon CRGO electrical steel, a person skilled in the art will appreciate that in other embodiments the core 502 may be formed of non-grain oriented steel. However, it has been found that grain oriented steel can provide improved magnetic performance of the core. Additionally, in some embodiments the core 502 may include a plurality of stacked layers or laminations. The core 502 may also be cut from steel sheets by stamping and subsequently stress relieved by annealing to stabilize magnetic performance.

Although the portions of each lead 512 extending beyond the circuit board 508 are shown and described as being insulated, a person skilled in the art will appreciate that in other embodiments only the portions of the leads 512 adjacent to, and securing, the core 502 may be insulated. The portions of the leads 512 that do not secure the core 502 may be trimmed to avoid short-circuiting, and the insulators 520 on the trimmed leads 512 may be omitted.

Figure 16:
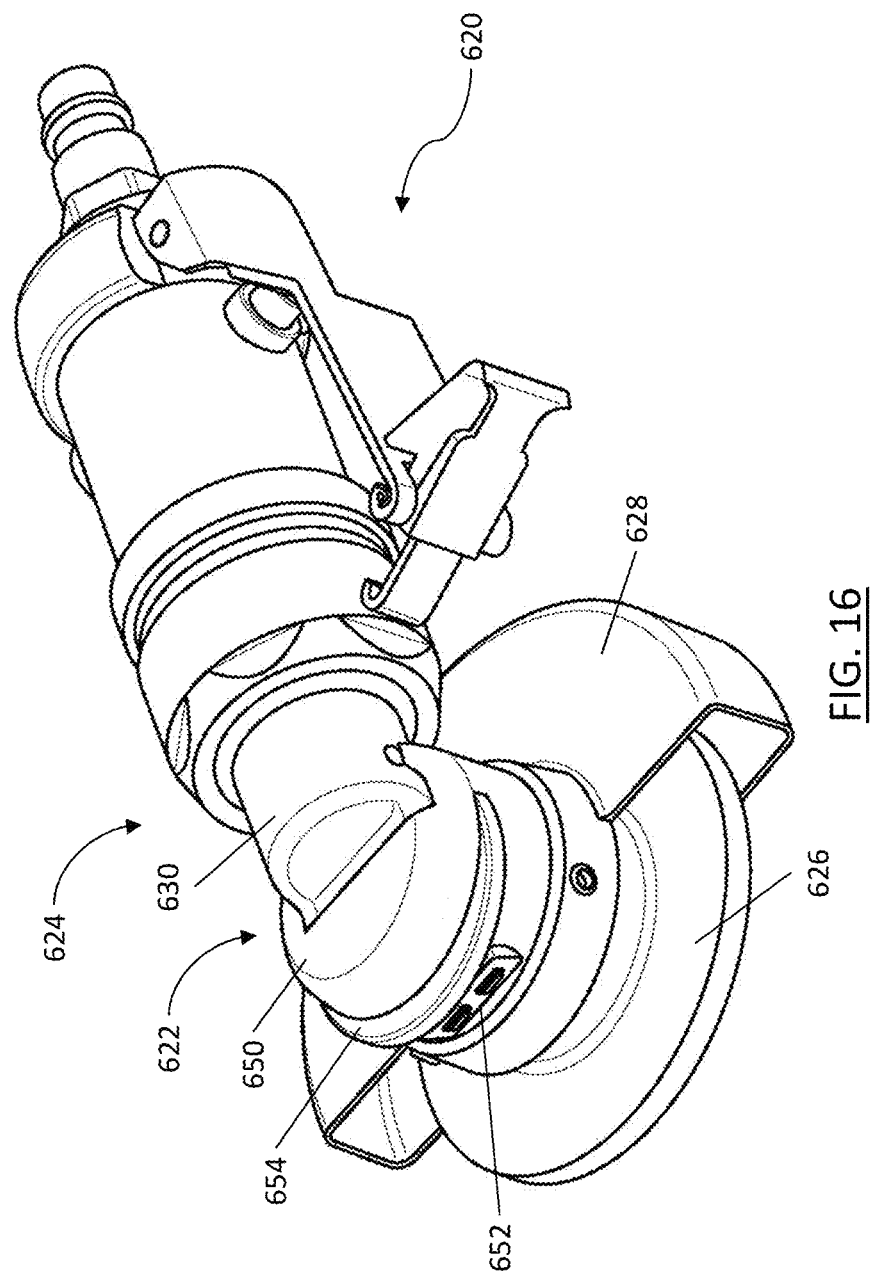
FIG. 16 is an axonometric view of a power tool with a power tool attachment secured thereto.
Figure 17:
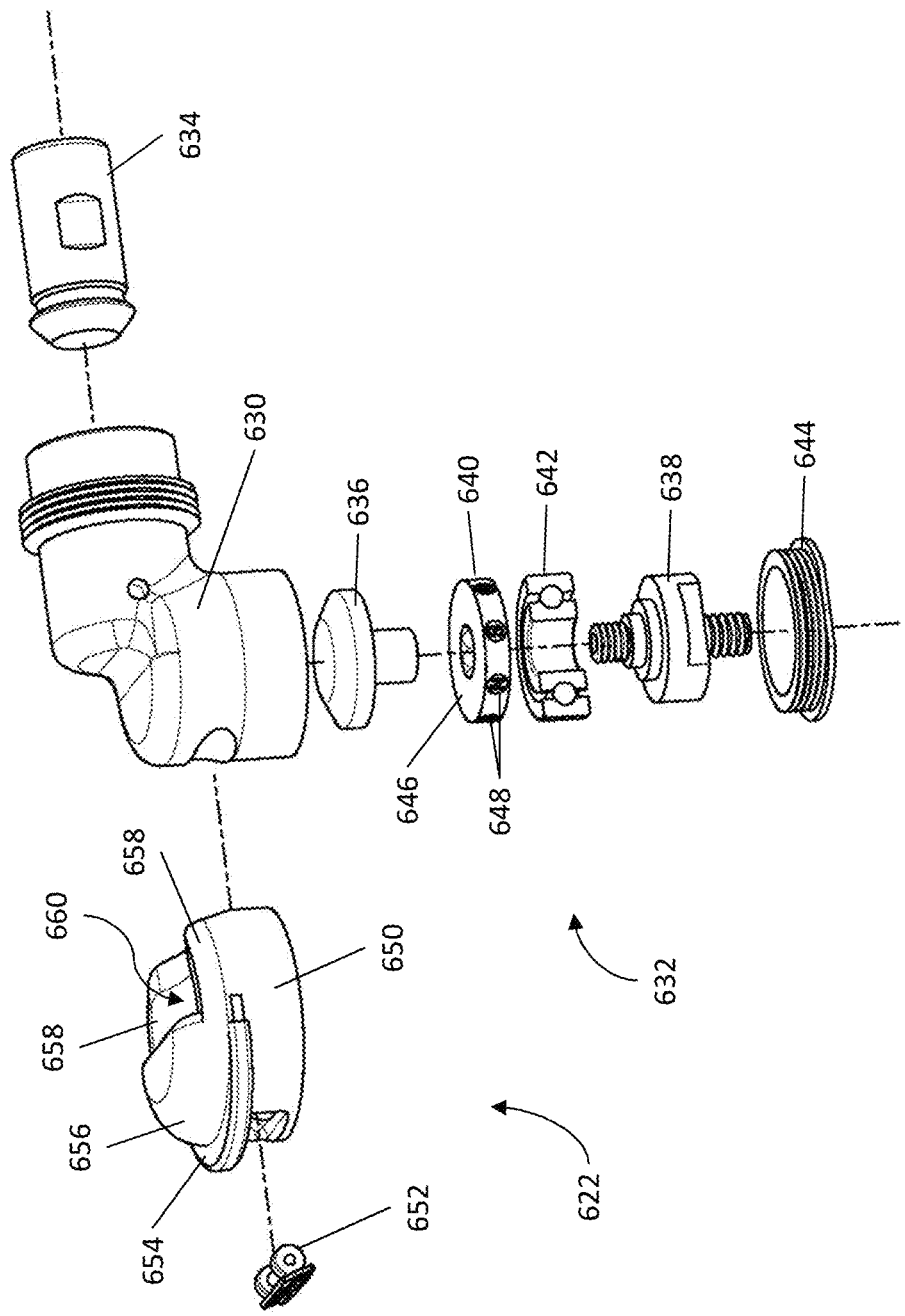
FIG. 17 is an exploded view of the front end of the power tool of FIG. 16.
Figure 18:
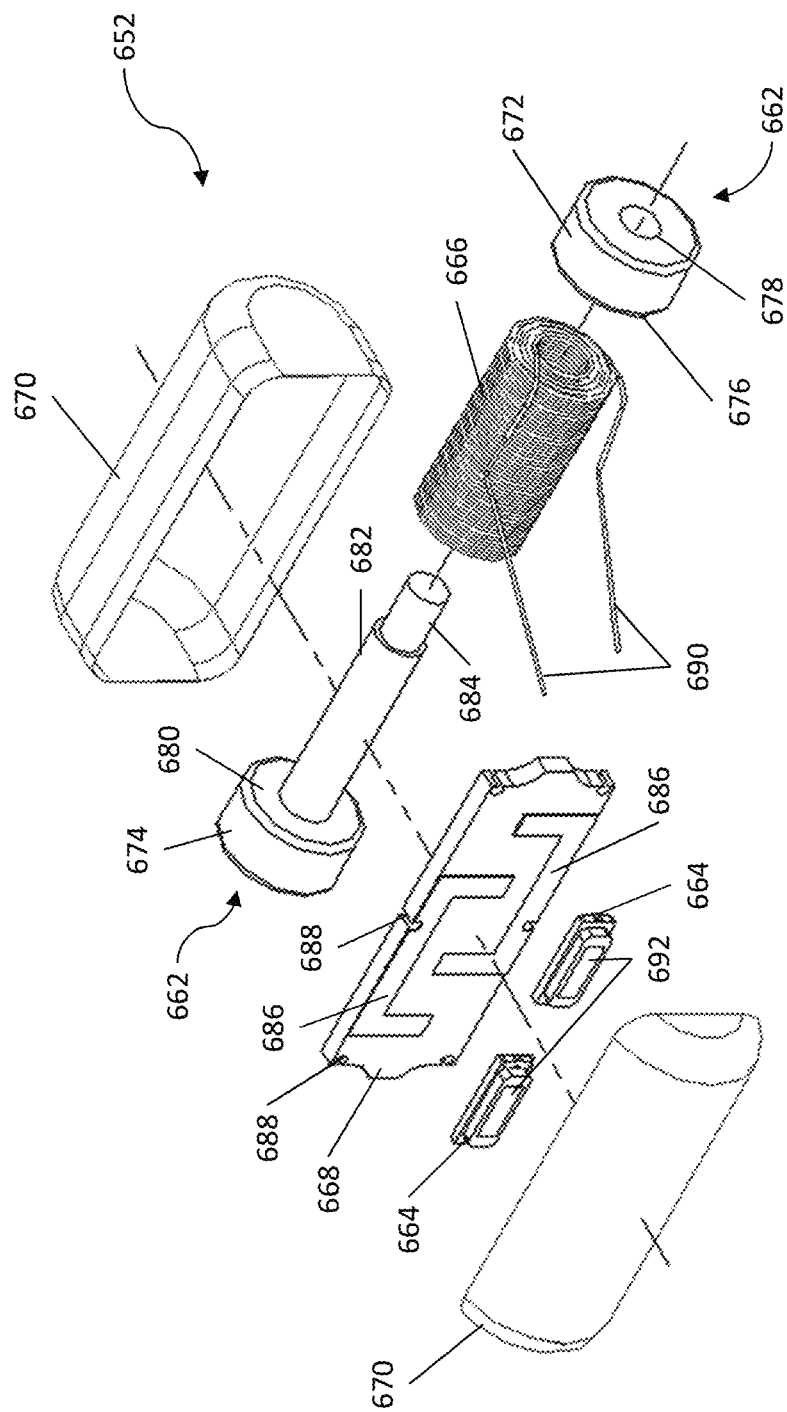
FIG. 18 is an exploded view of an MLD of power tool attachment of FIG. 16.

Turning to FIGS. 16 to 18, a power tool and a power tool attachment are shown and generally identified by reference characters 620 and 622, respectively. The power tool attachment 622 is secured to a front end 624 of the power tool 620, which is the working end of the power tool 620. In the present embodiment, the power tool 620 is a grinder and the power tool attachment 622 connects to the front end 624 above a grinding wheel 626 and a safety guard 628 of the grinder. Although, a person skilled in the art will appreciate that in other embodiments the power tool attachment described herein can be adapted for use with a wide variety of different power tools comprising rotating members and may connect to other parts of those power tools.

As shown in FIG. 17, the front end 624 of the power tool 620 includes a casing 630 that encloses a rotating power train or transmission, generally identified by reference character 632. The power train 632 includes a spindle gear 634, a pinion gear 636 and a spindle nut 638. The teeth of the gears 634, 636 have been omitted in FIG. 17 for simplicity. The spindle gear 634 is connected to the motor of the power tool 620, the pinion gear 636 is connected to the spindle gear 634, the spindle nut 638 is connected to the pinion gear 636 and the grinding wheel 626 is connected to the spindle nut 638. During use, the power train 632 rotates and transmits power from the motor of the power tool 620 to the grinding wheel 626. The power train 632 can include a gear reduction or gear increase, a change in direction (such as 90 degrees, as shown) or other transmission features, as would be apparent to a person skilled in the art. The casing 630 further encloses a multi-pole magnetic rotor 640, a bearing 642 and a clamp nut 644, for retaining the power train 632 within the casing 630. The bearing 642 is a cylindrical ball bearing, shown in section in FIG. 17.

The magnetic rotor 640 is secured to the power train 632 and rotates with the power train 632 during use to generate an alternating magnetic field, as described above, for powering an MLD. The magnetic rotor 640 comprises a body 646 and a plurality of cylindrical magnets 648. The magnets 648 are positioned in the body 646 in a pin-wheel arrangement about a central axis of rotation of the magnetic rotor 640. Each of the magnets 648 includes a pair of oppositely oriented poles, north (N) and south (S), and the plurality of magnets 648 are arranged in the body 646 such that the outwardly facing poles of the magnets 648 alternate around the circumference of the magnetic rotor 640. It will be appreciated that alternating in the above context can include a N-S-N-S repeating arrangement, or other repeating arrangement such as NN-SS-NN-SS, etc. The arrangement of the outwardly facing poles of the magnets 648 will be dependent on the MLD that is intended to be used with the magnetic rotor 640.

Although the magnetic rotor 640 shown in the embodiment of FIG. 17 is connected to the power train 632 beneath the pinion gear 636, a person skilled in the art would appreciated that in other embodiments the magnetic rotor could be connected elsewhere to the power train, could be driven off of the power train and/or could be integrated into the power train. For example, in some embodiments the cylindrical magnets of the magnetic rotor could be integrated into the pinion gear by increasing the size of the pinion gear and drilling holes in the pinion gear in the pin-wheel arrangement for receiving the magnets.

The power tool attachment 622 comprises a sleeve 650, an MLD 652 secured to the sleeve 650 and a bumper 654 attached to the sleeve 650. The MLD 652 is embedded within the sleeve 650 adjacent a front end of the sleeve 650. The bumper 654 is crescent-shaped and extends from the front end of the sleeve 650 to protect the MLD 652 from impacts during use of the power tool 620. In some embodiments, the bumper 654 may be integrally formed with the sleeve 650. The MLD 652 is positioned laterally in the sleeve 650, with opposite ends of the MLD 652 facing sideways and a side of the MLD 652 facing forward.

The sleeve 650 is generally cylindrical and comprises a front cap 656 and a pair of extensions 658, or wings, that project rearwardly from the front cap 656. The sleeve 650 defines a void 660 for receiving at least a portion of the front end 624 of the power tool 620. The void 660 is a complementary shape to the portion of the front end 624 and, when the front end 624 is received in the void 660, the extensions 658 extend around the portion of the front end 624 to secure the power tool attachment 622 to the power tool 620. The extensions 658 are resiliently deformable to facilitate receiving the front end 624 of the power tool 620 in the void 660. In the present embodiment, the sleeve 650 is formed of resilient deformable rubber. Although, it will be appreciate that in other embodiments the sleeve may be formed of a thermoplastic elastomer ("TPE") or other material such as aluminium or glass filled mouldable polymer, depending on the application in which the power tool attachment 620 is to be used. It will also be appreciated that the sleeve is highly adaptable and, in other embodiment, the shape of the sleeve may be adjusted to suit the power tool with which the power tool attachment is intended to be used.

As shown in FIG. 18, the MLD 652 comprises a bobbin 662, a pair of light sources 664, a coil 666 and a circuit board 668. When the MLD 652 is assembled, the coil 666 surrounds a core of the bobbin 662, a pair of opposing flanges adjacent opposite ends of the bobbin 662 secure the coil 666 therebetween, the light sources 664 are mounted to the circuit board 668 and the circuit board 668 electrically connects the coil 666 to the light sources 664. The assembled MLD 652 can be partially or fully encapsulated within a ultra-optically transparent encapsulation 670 (such as 90% to 95% optically transparent epoxy or silicone potting). Encapsulation, either partial or full, 670 can help to protect against environmental effects such as vibrations and abrasion.

The bobbin 662 is split into two constituent parts that connect to define the pair of opposing flanges and the core of the bobbin 662. The two constituent parts comprise a female end cap 672 and a male bobbin 674. The female end cap 672 includes a first flange 676 of the pair of opposing flanges and defines an axially extending through-hole 678 for receiving a portion of the male bobbin 674. The male bobbin 674 includes a second flange 680 of the pair of opposing flanges, an elongate, axially extending, cylindrical core portion 682 and a narrowed cylindrical end portion 684 opposite the second flange 680. The narrowed end portion 684 is received in the through-hole 678 to matingly engage the male bobbin 674 and the female end cap 672. When matingly engaged, the male bobbin 674 and the female end cap 672 define the bobbin 662. The length of the bobbin 662 is sized to extend between opposite outwardly facing poles of the magnetic rotor 640.

The circuit board 668 is generally rectangular and comprises a plurality of conductive traces 686 for electrically connecting the coil 666 to the light sources 664. A shallow recess (not shown) is defined on the back side of the circuit board 668, facing the bobbin 662 and the coil 666. When the MLD 652 is assembled, the bobbin 662 and the coil 666 are received in the shallow recess of the circuit board 668 to reduce the overall size of the MLD 652. The bobbin 662 and the coil 666 can be adhesively secured in the shallow groove in some embodiments. The circuit board 668 further comprises a plurality of through-holes 688 spaced about its perimeter.

The coil 666 comprises a number of turns of wire ending in a pair of coil leads 690. When the MLD 652 is assembled, the coil leads 690 extend through at least one of the though-holes 688 in the circuit board 668 and are electrically connected to the traces 686 on the circuit board 668. When the coil 666 is exposed to an alternating magnetic field (such as the one generated by the magnetic rotor 640), the induced voltage can be used to power the light sources 664 of the MLD 652, as previously described. In the present embodiment, the coil 666 comprises from 250 to 500 turns of magnet wire having a diameter of approximately 0.004 to 0.007 inches, and more particularly from 340 to 500 turns of wire having a diameter of approximately 0.004 to 0.005 inches. The magnet wire is coated with a non-conductive coating to inhibit short-circuiting of the coil 666. The coil leads 690 are bared of this coating. The coil leads 690 can be soldered to the traces 686 between the through-holes 688 or electrically connected to the traces 686 using other means, such as wire-to-board hardware.

Each light source 664 comprise a surface-mount device LED (SMD LED) that is electrically connected to and bridges the ends of adjacent traces 686 on the circuit board 668. The light sources 664 are align in opposite electrical orientations so that one of the light sources 664 is active in each half-cycle of the AC generated by the coil 666. Accordingly, the MLD 652 can provide a generally uninterrupted luminescence during a full wave of AC generated by the coil 666 without using a rectifier to convert the AC generated by the coil 666 to DC. The light sources 664 are positioned along a longitudinal centerline of the circuit board 668, with their emitting faces 692 oriented outward from a side of the MLD 652.

During use, the MLD 652 functions similarly to those described above. However, MLD 652 emits light from its longitudinal side and is accordingly referred to as a side-emitting MLD, in contrast to the MLDs 28, 500 described above that emit light from their end and are generally referred to as end-emitting MLDs.

Although side-emitting MLDs and end-emitting MLDs have been described above, it will be appreciated that in other embodiments the light sources of the MLD can be oriented in other directions. For example, the light sources of the MLD could be oriented in a plurality of directions to form a multi-directional or omni-directional MLD.

Although the constituent parts of the bobbins disclosed herein have been shown and described as being connected by mating, a person skilled in the art will appreciate that in other embodiments the constituent parts of the bobbin can be connected using alternative or additional means such as adhesives, threading and the like. Additionally, a person skilled in the art will appreciate the constituent parts can be connected directly or indirectly to define the bobbin in other embodiments.

Although the light sources have been disclosed as separate elements in the above embodiments, a person skilled in the art would appreciated that in other embodiments the light sources may be integrally formed on the circuit board, for example the light sources can be integrally formed LEDs, which are also known as chip-on-board (COB) LEDs. In embodiments of the MLD 28 using such integrally formed LEDs, the circuit board would be located adjacent a front end of the MLD instead of adjacent a back end of the MLD. Although the light sources in the above embodiments have been described as LEDs that produce from 16 to 26 lumens of light when a voltage of 2.5 to 5 volts is applied across their leads, a person skilled in the art will appreciate that in other embodiments the amount of light produced and the voltage required by the light source may fall outside of these recited ranges, particularly as LED and light source technology advances. In some embodiments, the MLD may comprise a light source requiring a voltage as low as 1.5 volts to as high as 10 volts. In some embodiments, the LEDs may emit wavelengths of light that are outside the visible spectrum, for example the LEDs may emit ultraviolet or infrared light. In some embodiment the LEDs may emit different colours of visible light.

Although the coils have been described above as comprising from 250 to 500 turns in some embodiments, or approximately 200 turns in other embodiments, of magnet wire having a diameter of approximately 0.004 to 0.007 inches, a person skilled in the art will appreciate that in further embodiments the coils may comprise more or fewer turns of wire than those listed above, may comprise pure or generally pure copper and may have a different diameter that may be outside the range of 0.004 to 0.007 inches. The number of turns, diameter and material of the wire in the coils will depend on the strength of the alternating magnetic field with which the MLD is intended to be used and the electrical loads in the MLD (such as the load of the light source or light sources). In some embodiments, the coil may be formed of aluminium or other conductive material.

Although the coil of the MLD has been described as producing a voltage of 2.5 to 5 volts in the embodiments shown and described above, in other embodiments the coil of the MLD may output a voltage from 1.5 to 10 volts. In some embodiments the coil of the MLD may output up to 24 volts. As will be appreciated by a person skilled in the art, the voltage produced by the coil will depend on the arrangement of the MLD, including the material of the bobbin and the specification of the coil (such as the number of turns, the material and the thickness of the wire), as well as the strength of the alternating magnetic field.

Although the circuit board has been described as comprising conductive traces for connecting the leads of the light source to the coil leads, a person skilled in the art will appreciate that in other embodiments the coils leads may be connected directly to the leads of the light source and the circuit board may be omitted from the MLD entirely. It will be appreciated that in some embodiments the conductive traces can be printed using conductive ink.

Although the leads of the light source have been described in the above embodiments as being made of wire, a person skilled in the art will appreciated that in other embodiments the leads may be formed of printable conductive material, which may be 3-D printed into the desired shape and configuration. In some embodiments, the coil may be formed entirely of printable conductive material, which can be 3-D printed into the desired coil specification (i.e. number of turns, material and thickness of the wire).

Although the bobbin has been described as split into two constituent parts comprising a female bobbin and a male bobbin, a person skilled in the art will appreciate that in other embodiments the bobbin may comprise a single part or more than two constituent parts. In some embodiments, the bobbin may comprise two or more constituent parts that are axially split in the longitudinal direction of the bobbin, rather than laterally split as shown in at least the above embodiment comprising the female and male bobbins. Providing axially split constituent parts may facilitate casting and/or of the constituent parts. In yet other embodiments, the bobbin may comprise constituent parts that are split both axially and laterally.

Although the bobbin has been described as comprising two flanges, a person skilled in the art will appreciate that in other embodiments the bobbin may comprise more or fewer than two flanges. In some embodiments, the bobbin may comprise only one flange, which may be located at an end of the bobbin. In yet other embodiments, the bobbin may comprise no flanges and may be cylindrical. It has been found that in embodiments where the bobbin lacks a flange at one or both ends, using a multi-pole magnetic rotor comprising two magnetic rings aligned with, and in close proximity to, the ends of the bobbin may facilitate inducing sufficient electric current to power the light source of the MLD, as described above.

Although the bobbins and the cores have been described above as being made from a ferrous metal with a high magnetic permeability, such as annealed solenoid grade stainless steel or 3% silicon CRGO electrical steel, a person skilled in the art would appreciate that in other embodiments the bobbins and the cores may be made from non-grain oriented steel, nickel-iron, stainless steel 420, silicon steels or other materials with high magnetic permeability (i.e. magnetically-soft materials). Magnetically-soft, or high magnetic permeability, materials can easily absorb alternating magnetic fields and release them without becoming magnetized in the absence of a magnetic field. Examples of a magnetically-soft, or high magnetic permeability, material include Hiperco® 50 Premendur V.

Although the sleeve has been described as being formed of rubber, a thermoplastic elastomer, aluminium or a glass filled mouldable polymer in the above embodiments, a person skilled in the art will appreciated that in other embodiments the sleeve may be formed of other materials. In some embodiments, the sleeve may be formed of materials that do not heat substantially when exposed to alternating magnetic fields, such as 304 stainless steel, 316 stainless steel or 316L stainless steel. It will also be appreciated that in some embodiments other elements of the power tool that are in proximity the MLD or ielectrolunduction-powered device and are exposed to the alternating magnetic field may also be formed of materials that do not heat substantially when exposed to alternating magnetic fields. This can reduce tool heating, which may increase the life of the power tool, the power tool attachment, the MLD and/or the induction-powered device.

Although the alternating magnetic field has been described as being supplied or generated by a rotating multi-pole magnetic rotor in the above embodiments, a person skilled in the art will appreciated that in other embodiment the alternating magnetic field may be supplied by other sources such as electrical sources or environmental effects.

Although embodiments have been described, it will be appreciated by those skilled in the art that variations and modifications may be made without departing from the scope defined by the appended claims, and the scope of the claims should be given the broadest interpretation consistent with the description as a whole.

What is claimed is:

1. An induction-powered device for use in an alternating magnetic field, the induction-powered device comprising:
    a bobbin having a pair of opposing flanges and a magnetically permeable core therebetween, the bobbin including at least two constituent parts that connect to form the pair of opposing flanges and the core, wherein the at least two constituent parts of the bobbin comprise:
        a female bobbin having a first flange of the pair of opposing flanges and a female core portion; and
        a male bobbin having a second flange of the pair of opposing flanges and a male core portion for mating with the female core portion,
        wherein the male core portion and the female core portion define the core of the bobbin when mated;
    an electrically conductive coil surrounding the core; and
    an electrical load electrically connected to the coil and nested within the core,
    wherein the coil is configured to generate a voltage when exposed to the alternating magnetic field, to power the electrical load, and
    wherein the at least two constituent parts, when separate, permit the coil to be positioned around at least a portion of the core and, when connected, retain the coil around the core.

2. The induction-powered device of claim 1, wherein the electrical load comprises a light source having at least one light emitting diode (LED).

3. The induction-powered device of claim 2, wherein the light source is configured to emit from 16 to 26 lumens of light.

4. The induction-powered device of claim 1, wherein the at least two constituent parts, when separate, disconnect at least a portion of the opposing flanges from the core to permit the coil to be positioned around the portion of the core and, when connected, position the coil between the pair of opposing flanges to retain the coil around the core.

5. The induction-powered device of claim 1, wherein the electrical load abuts the male core portion and the female core portion when mated, to retain the electrical load within the core of the bobbin.

6. The induction-powered device of claim 1, wherein the core is made of a high magnetic permeability material.

7. The induction-powered device of claim 1, wherein the coil comprises from 250 to 500 turns and is made of conductive wire having a diameter in the range of approximately 0.004 to 0.007 inches, and more particularly from 350 to 500 turns of conductive wire having a diameter in the range of approximately 0.004 to 0.005 inches.

8. The induction-powered device of claim 1, wherein the coil is configured to generate a voltage of 24 volts or less, and more particularly from 1 to 10 volts, and even more particularly from 2.5 to 5 volts when exposed to the alternating magnetic field.

9. The induction-powered device of claim 1, wherein the coil is configured to generate a voltage from 2.5 to 5 volts when exposed to the alternating magnetic field having an intensity of 500 to 1500 AC gauss.

10. A power tool attachment comprising:
    at least one induction-powered device as defined in claim 1; and
    a sleeve configured to secure the at least one induction-powered device to a power tool.

11. A power tool comprising:
    at least one induction-powered device as defined in claim 1;
    a motor; and
    a multi-pole magnetic rotor for generating an alternating magnetic field to power the induction-powered device, the magnetic rotor being coupled to the motor.

12. The induction powered device of claim 1, wherein the electrical load is positioned along a central axis of the bobbin.

13. An induction-powered device for use in an alternating magnetic field, the induction-powered device comprising:
    a bobbin having a pair of opposing flanges and a magnetically permeable core therebetween, the bobbin including at least two constituent parts that connect to form the pair of opposing flanges and the core;
    an electrically conductive coil surrounding the core; and
    an electrical load electrically connected to the coil and nested within the core,
    wherein the coil is configured to generate a voltage when exposed to the alternating magnetic field, to power the electrical load, and
    wherein the coil comprises from 250 to 500 turns and is made of conductive wire having a diameter in the range of approximately 0.004 to 0.007 inches, and more particularly from 350 to 500 turns of conductive wire having a diameter in the range of approximately 0.004 to 0.005 inches.

* * * * *